(12) United States Patent
Prouty, IV

(10) Patent No.: US 9,291,829 B2
(45) Date of Patent: Mar. 22, 2016

(54) GEOMETRICALLY AND OPTICALLY CORRECTED PARALLAX BARRIER PROVIDING AUTOSTEREOSCOPIC VIEWING OF A DISPLAY

(75) Inventor: Dwight Prouty, IV, Conifer, CO (US)

(73) Assignee: GRILLI3D LLC, Conifer, CO (US)

( * ) Notice: Subject to any disclaimer, the term of this patent is extended or adjusted under 35 U.S.C. 154(b) by 891 days.

(21) Appl. No.: 13/284,464

(22) Filed: Oct. 28, 2011

(65) Prior Publication Data

US 2012/0105954 A1    May 3, 2012

Related U.S. Application Data

(60) Provisional application No. 61/407,496, filed on Oct. 28, 2010.

(51) Int. Cl.
*G02B 27/22* (2006.01)
*H04N 13/04* (2006.01)

(52) U.S. Cl.
CPC ........ *G02B 27/2214* (2013.01); *G02B 27/2264* (2013.01); *H04N 13/0409* (2013.01)

(58) Field of Classification Search
CPC .. G02B 27/2214; G02B 27/225; G02B 27/22; G02B 27/2221; H04N 13/0409; H04N 13/0418; H04N 13/0411; H04N 13/0413

USPC .............. 359/462, 464; 348/51, 54; 345/6, 32
See application file for complete search history.

(56) References Cited

U.S. PATENT DOCUMENTS

| | | | | |
|---|---|---|---|---|
| 7,268,943 | B2 * | 9/2007 | Lee | G02B 27/2214 348/56 |
| 7,505,203 | B2 * | 3/2009 | Nam et al. | 359/464 |
| 8,436,787 | B2 * | 5/2013 | Chen et al. | 345/6 |
| 2003/0214471 | A1 * | 11/2003 | Topelberg | 345/87 |
| 2006/0087556 | A1 * | 4/2006 | Era | 348/51 |
| 2011/0187832 | A1 * | 8/2011 | Yoshida | A63F 13/02 348/46 |

FOREIGN PATENT DOCUMENTS

GB    2405043 A  *  2/2005

\* cited by examiner

*Primary Examiner* — Audrey Y Chang
(74) *Attorney, Agent, or Firm* — Kilpatrick Townsend & Stockton LLP

(57) ABSTRACT

A apparatus and method of enabling autostereoscopic viewing of displays with a parallax barrier apparatus is provided. In one embodiment, the present invention employs a parallax barrier, comprising a plurality of opaque barrier lines, disposed on a flexible substrate that can adhere to an existing display. One application of the present invention is in enabling autostereoscopic viewing of a display that is not otherwise configured to display 3D images.

15 Claims, 30 Drawing Sheets

| Location | Results | Formula |
|---|---|---|
| ▼ Sheet 1 | | |
| ▶ GridSpec | | |
| ▼ Table 2 | | |
| D5 | 19.704242424... | =D4*D3 |
| D6 | 0.0382196969... | =D7/D3^2 |
| D7 | 19.568484848... | =$H$12*($D$13-$D$11)^2 |
| D9 | 0.0191098484... | =D6/2 |
| D10 | 0.0191098484... | =D6-D9 |
| D12 | 17.912509385... | =DEGREES(ATAN2(D11,D18)) |
| D18 | 9.8521212121... | =D5/2 |
| D23 | 19.874242424... | =D7+(2*D21*D9) |
| E4 | 0.0075757575... | =D4/2.54 |
| E5 | 7.7573757575... | =D5/2.54 |
| E6 | 0.0150471247... | =D6/2.54 |
| E7 | 7.7041278930... | =D7/2.54 |
| E8 | 0.9931102362... | =D7/D5 |
| E9 | 0.0075235623... | =D9/2.54 |
| E10 | 0.0075235623... | =D10/2.54 |
| E11 | 0.0826771653... | =D11/2.54 |
| E12 | 0.3126322660... | =ATAN2(D11,D18) |
| E13 | 12 | =D13/2.54 |
| E14 | 2.5 | =D14/2.54 |
| H12 | 0.3232323232... | =TAN($E$12) |

FIG. 16C

GEOMETRICALLY AND OPTICALLY CORRECTED PARALLAX BARRIER PROVIDING AUTOSTEREOSCOPIC VIEWING OF A DISPLAY

CROSS-REFERENCES TO RELATED APPLICATIONS

The present application claims benefit under 35 USC 119 (e) of U.S. Provisional Application No. 61/407,496, filed on Oct. 28, 2010 of which the entire disclosure is incorporated herein by reference for all purposes.

COPYRIGHT AUTHORIZATION NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Modern display technologies have begun to incorporate features to allow stereoscopic (more popularly "3-dimensional," or "3D") viewing of images formed for the purpose on the display. Such technologies vary, but can include polarized or alternate-frame sequencing displays requiring a user to wear specialized headgear such as polarized or active shutter glasses. In addition, autostereoscopic technologies such as parallax barrier and lenticular displays, among others, enable 3D viewing without the need for special headgear or glasses. However, each of these technologies are costly and the 3D-enabling components typically must be integrated into the display.

SUMMARY OF THE INVENTION

A apparatus and method of enabling autostereoscopic viewing of displays with a parallax barrier apparatus is provided. In one embodiment, the present invention employs a parallax barrier, comprising a plurality of opaque barrier lines, disposed on a flexible substrate that can adhere to an existing display. One application of the present invention is in enabling autostereoscopic viewing of a display that is not otherwise configured to display 3D images.

An example parallax barrier for autostereoscopic viewing of a display with a plurality of columns of pixels, according to the disclosure, includes a substrate comprising a transparent material, and a plurality of parallel barrier lines disposed on the substrate. Each parallel barrier line of the plurality of parallel barrier lines has a width and a height configured to, when the parallax barrier is coupled to the display, obstruct viewing of at least one column of pixels by one eye of a viewer of the display when the viewer is located at one of a plurality of viewing areas. The total number of parallel barrier lines of the parallax barrier is configured to exceed half of the total number of columns of pixels of the display.

The example parallax barrier can include one or more of the following additional features. Each parallel barrier line of the plurality of parallel barrier lines is configured to, when the parallax barrier is coupled to the display, obstruct viewing of two or more adjacent columns of pixels. The substrate comprises a flexible material. At least one of the parallel barrier lines has a different width than another of the parallel barrier lines. The width of a first parallel barrier line near a center portion of the parallax barrier is greater than the width of a second parallel barrier line near an edge portion of the parallax barrier. The width of each parallel barrier line of the plurality of parallel barrier lines is configured such that the parallax barrier provides cylindrical correction for at least one of the plurality of viewing areas. The width of each parallel barrier line of the plurality of parallel barrier lines is configured such that the parallax barrier provides bispheric correction for at least one of the plurality of viewing areas.

An example method of manufacturing a parallax barrier for autostereoscopic viewing of a display with a plurality of columns of pixels, according to the disclosure, includes providing a substrate comprising a transparent material and forming a plurality of parallel barrier lines on the substrate. Each parallel barrier line of the plurality of parallel barrier lines is formed to have a width and a height configured to, when the parallax barrier is coupled to the display, obstruct viewing of at least one column of pixels by one eye of a viewer of the display when the viewer is located at one of a plurality of viewing areas. The width of a first parallel barrier line plus a distance between the first parallel barrier line and a second parallel barrier line is less than twice a width of the at least one column of pixels of the display.

The example method of manufacturing a parallax barrier can include one or more of the following additional features. Each parallel barrier line of the plurality of parallel barrier lines is configured to, when the parallax barrier is coupled to the display, obstruct viewing of two or more adjacent columns of pixels. The substrate comprises a flexible material. At least one of the parallel barrier lines is formed to have a different width than another of the parallel barrier lines. The width of a third parallel barrier line near a center portion of the parallax barrier is greater than the width of a fourth parallel barrier line near an edge portion of the parallax barrier. The width of each parallel barrier line of the plurality of parallel barrier lines is configured such that the parallax barrier provides cylindrical correction for at least one of the plurality of viewing areas. The width of each parallel barrier line of the plurality of parallel barrier lines is configured such that the parallax barrier provides bispheric correction for at least one of the plurality of viewing areas.

An example apparatus which, when coupled to a display with a plurality of columns of pixels, enables autostereoscopic viewing of the display, according to the disclosure, includes a transparent substrate configured to be coupled to the display, The transparent substrate has a plurality of parallel barrier lines. Each parallel barrier line of the plurality of parallel barrier lines has a width and a height configured to, when the apparatus is coupled to the display, obstruct viewing of at least one column of pixels by one eye of a viewer of the display when the viewer is located at one of a plurality of viewing areas. Each parallel barrier line of the plurality of parallel barrier lines is separated from another parallel barrier line by an adjacent transparent channel-aperture. A barrier period, defined by the width of one parallel barrier line plus the width of one transparent channel aperture, is less than twice a width of the at least one column of pixels of the display.

The example apparatus can include one or more of the following additional features. The width of at least one parallel barrier line is adjusted to compensate for a thickness of the at least one parallel barrier line. The transparent substrate is configured to removably adhere to a surface of the display. The transparent substrate comprises a flexible material. The at least one column of pixels comprises two or more adjacent columns of pixels. At least one of the parallel barrier lines has a different width than another of the parallel barrier lines.

Numerous benefits are achieved by way of the present invention over conventional techniques. For example, embodiments of the present invention enable viewing of a display that is not otherwise configured to display 3D images. Additionally, embodiments can include relatively inexpensive materials and/or manufacturing processes to provide for 3D viewing of a display at a relatively inexpensive cost, compared with other methods for enabling displays for 3D viewing. Furthermore, various adjustments can be made to increase the quality of 3D viewing of a display at a variety of angles and distances.

These and other embodiments of the invention along with many of its advantages and features are described in more detail in conjunction with the text below and attached figures.

BRIEF DESCRIPTION OF THE DRAWINGS

FIGS. 16A-C are screen captures of calculation spreadsheet for calculating barrier line widths, according to an embodiment.

Figure 1:
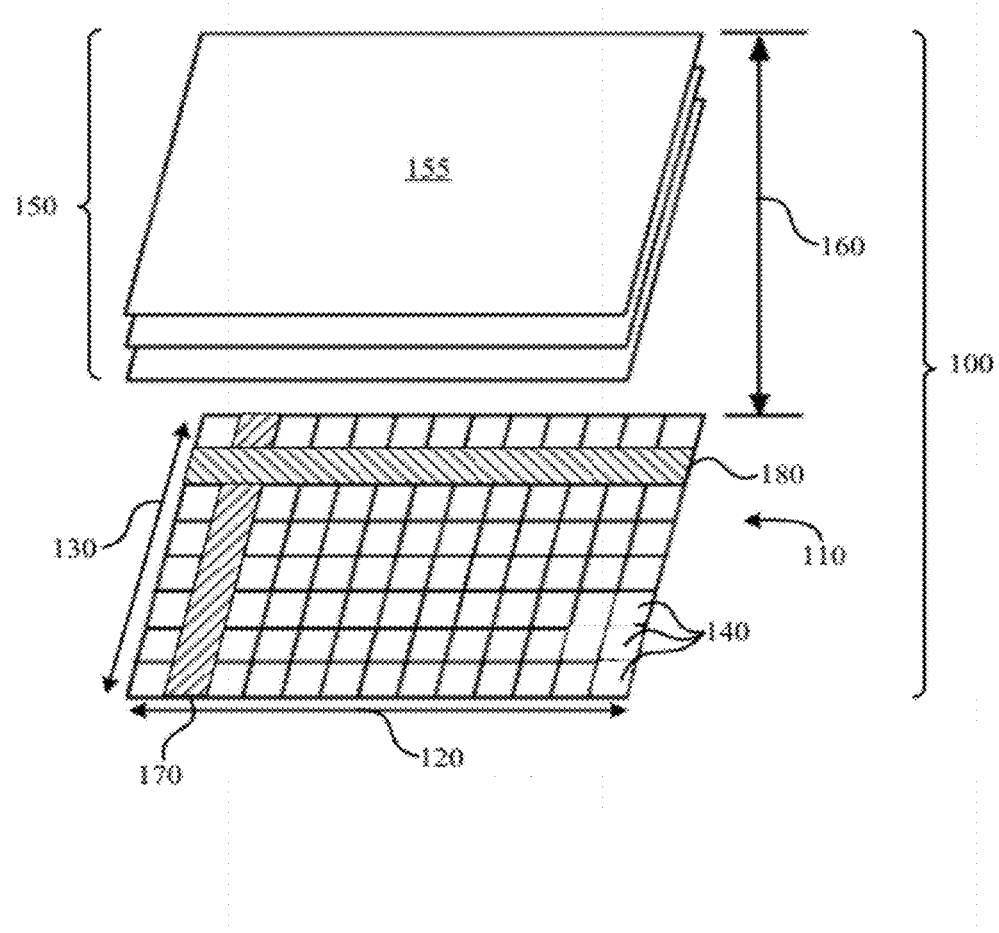
FIG. 1 is a simplified diagram of a typical electronic display.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides embodiment(s) of the invention only, and is not intended to limit the scope, applicability or configuration of the disclosure. Rather, the ensuing description of the embodiment(s) will provide those skilled in the art with an enabling description for implementing an embodiment. It being understood that various changes may be made in the function and arrangement of elements as may be appropriate for a large variety of displays and purposes without departing from the spirit and scope.

The present invention is directed toward an apparatus and method for providing parallax barrier enabling autostereoscopic viewing of a display. Typical autostereoscopic displays integrate lenticular or parallax components into the display, often coupling such components directly to picture elements of an underlying grid of picture elements (pixels) of the display. Such components are therefore frequently located underneath protective layers and are irremovable from the display. Additionally, because the components enabling autostereoscopic viewing are typically introduced during the manufacture of a display, displays without such components generally have no means of providing autostereoscopic viewing.

The present invention enables autostereoscopic viewing where parallax components may be physically separated from the underlying grid of picture elements of the display, including, but not limited to cases where intervening protective and other layers of material and films may be desired, or already in place, facilitating the manufacture of autostereoscopic three-dimensional (3D) displays. One example includes using standard two-dimensional (2D) display subassemblies in the course of manufacturing where removal of one or more integrated films might be expensive or infeasible to ease integration of lenticular or parallax components to give rise to an autostereoscopic 3D display, thus reducing design and manufacturing costs otherwise required to create 2D display assemblies designed specifically for autostereoscopic 3D displays.

The present invention enables autostereoscopic viewing of displays, including displays that may not have integrated autostereoscopic components. In one embodiment, a parallax barrier apparatus employs a parallax barrier disposed on a flexible substrate that can adhere to an existing display. This parallax barrier apparatus may be formed in any number of ways and disposed on various substrates, as discussed herein. One application of the present invention is in enabling autostereoscopic viewing of a display that is not otherwise configured to display 3D images autostereoscopically. The present invention will be described with reference to drawings. One of ordinary skill in the art would appreciate that the applications described herein are examples of how the broader concept can be applied.

The essence of stereo imaging and viewing is that two images are required where each is recorded from a different point of observation and therefore record scenes with different information and unique perspectives. The strength of the stereo effect depends on the difference between the locations of the points of observation. In human stereo vision, this is called the inter-pupillary distance. Stereo cameras use two apertures and lenses separated by a similar distance. For stereo viewing, it is necessary to selectively provide each human eye with only one of the two images. When the two images combine in the human observer's brain to provide the perception of depth, the condition is called "stereo convergence."

Those having ordinary skill in the art will appreciate that a parallax barrier can provide autostereoscopic viewing of a display by providing two different images: one for each eye of a viewer of the display. The display image typically consists of rows and columns of picture elements (i.e., "pixels"). For example, a display may have 768 rows in height by 1024 columns in width. The image can be encoded such that the two different images are vertically interlaced column by column on an underlying grid of picture elements of the display: a first set of vertical columns of image elements showing a first image, and a second set of vertical columns of image elements showing a second image, the two sets of vertical columns of image elements being interleaved to provide the vertical interlacing, alternating left-right across the display. As described in further detail below, depending on the desired application and functionality, the vertical columns of image elements can have different widths. According to one embodiment, the vertical columns of image elements are each one picture element wide. According to other embodiments, they can be two picture elements wide, three picture elements wide, etc. One advantage of such vertical interlacing is that, unlike other 3D display systems, there are no increased bandwidth requirements to enable 3D image and video transmission to 3D displays.

FIG. 1 depicts a display portion of an electronic display device 100, having a electronic display 110 which might be devised using plasma, LCD, LED, or certain flat-screen CRT technologies, among others. (For simplicity, only relevant optical components of the electronic display device 100 are not shown. Other components, such as electrical and/or mechanical components, are omitted) Such displays have a horizontal dimension 120 and a vertical dimension 130, which, for convenience only throughout this patent application, shall be deemed that the long dimension of such display is horizontal and the short dimension vertical. Each display is typically comprised of an array of pixels 140—elements emitting colored light (typically red, green and blue)—which, when combined by varying intensities give rise to displaying a rainbow of colors plus white light. Such pixel arrays are most often configured in vertical columns 170 and horizontal rows 180. The electronic display 110, as illustrated, is often augmented by one or more layers 150 of materials and films to enable practical functionality, protect the electronic display 110 from the external environment, and/or protect the viewer (for example from UV light used to create colored light by way of exciting florescence).

The distance 160 from the front surface 155 of a electronic display device 100 may be distant from the typically planar pixel arrays comprising the electronic display 110 (the plane from which light originates and is emanated). Intervening layers 150 and films may not be parallel to the plane of the electronic display 110. Indeed, such layers 150 and films may not be planar in extent and may not have uniform thickness throughout. These effects usually impose little to no discernable aberration to viewing the image formed on the electronic display 110 (as viewed externally to the display apparatus).

Figure 2:
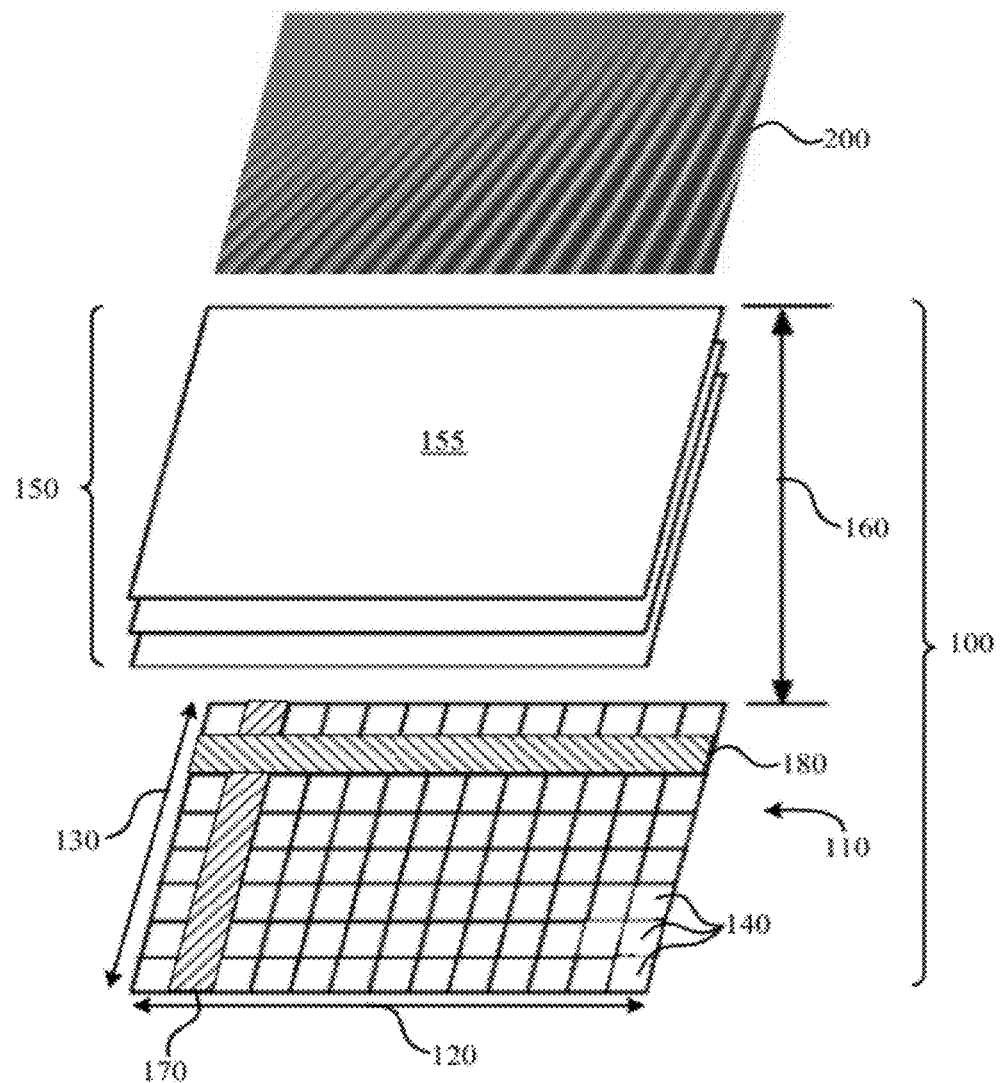
FIG. 2 is a simplified diagram of a lenticular lens array integrated with an electronic display to effect autostereoscopy of 3D images displayed horizontally on such.

FIG. 2 presupposes the addition of a lenticular lens array 200 to the front surface 155 of an electronic display device 100, the objective being to create an autostereoscopic display capable of separating adjacent columns of pixels displaying image information, column by column, intended for separate reception by left and right eyes viewing the display to create the illusion of a three-dimensional image. This is the same technique used to create the illusion of three-dimensional images from a static image fixed onto the rear (typically flat) surface of the lenticular lens array 200. The geometry of general lenticular arrays is illustrated below, as is the mathematical description of how lenticular arrays work.

For instance, the angle of view of a lenticular array can be determined by using ray geometry to calculate the maximum angle at which a ray can exit the correct lenticular cell. Where R is the angle between the extreme ray and the normal at a point where it exits the lens, p is the width (or pitch) of each lenticular cell, r is the radius of curvature of the lenticular cell, and h is the thickness of the substrate below the curved surface of the lenticular cells:

$$R = A - \arctan\left(\frac{p}{h}\right)$$

where $$A = \arcsin\left(\frac{p}{2r}\right).$$

Additionally, where e is the thickness of the lenticular cell and f is the thickness of the curved surface of the lenticular cell (e.g., e-h) the distance from the back of the grating to the edge of the lenticule, a relationship between f, r, and p can be established as follows:

$$f = r - \sqrt{r^2 - \left(\frac{p}{2}\right)^2}.$$

Having calculated the maximum angle at which a ray can exit the correct lenticular cell, the full angle of observation O can be calculated by:

$$O = 2(A-I)$$

Where I is the angle between the extreme ray and the normal outside the lens. With n as the index of refraction, Snell's Law provides:

$$I = \arcsin\left(\frac{n\sin(R)}{n_a}\right)$$

Where $n_a$, the index of refraction of air can be approximated at 1.003.

A simplified lensmaker's equation can provide the focal length, F, of each lenticular cell:

$$F = \frac{r}{n-1}$$

and the back focal plane, with respect to the back of the lens, can be calculated by $$BFD = F - \frac{e}{n}.$$

Lenticular lenses typically have a rear focal plane that coincides with the back plane of the lens, such that BFD=0, or $$e = \frac{nr}{n-1}.$$

As can be seen from the above equations, successful implementation of lenticular arrays are best obtained when the lenticular array can be located proximate to, if not in direct contact with, the light emitting surface of an electronic display 110. Given a fixed pitch, p, which is driven by pixel dimensions, apparent depth of three-dimensional images are greatly affected by h, the thickness of the lens, and any separation between the lens and the light emitting surface. Light gathering ability, focus sensitivity, image separation and, hence, left-right image separation is diminished asp diminishes as a consequence of increasing h. Uniformity of any such three-dimensional image is very dependent upon the lenticular lens array 200 being fixed parallel (both physically and optically) with respect to the light emanating surface of the electronic display 110. Intervening layers 150 of materials and films can affect the requisite optical parallelism due to local tilt, inconsistent thickness (affecting optical refraction), and deviations from being planar.

Accordingly, autostereoscopy using lenticular arrays is most successfully realized when the array is designed into the electronic display device 100, as close as possible to, if not in direct contact with, the light emanating surface of an electronic display 110. Protective and other layers 150 and films are best located between a lenticular lens array and the external environment, as opposed to the configuration illustrated in FIG. B. Hence, retrofitting existing two-dimensional electronic display devices 100 with an externally applied lenticular lens array 200 to achieve autostereoscopy usually is quite difficult and expensive to achieve.

Additionally, it can be shown that creating three-dimensional images that appear to exist in front of an electronic display device 100 by way of lenticular lens-created autostereoscopy is difficult to achieve and very seriously impeded by the introduction of distance 160 from the light emitting surface and introduction of intervening aberrating materials and films.

Figure 3:
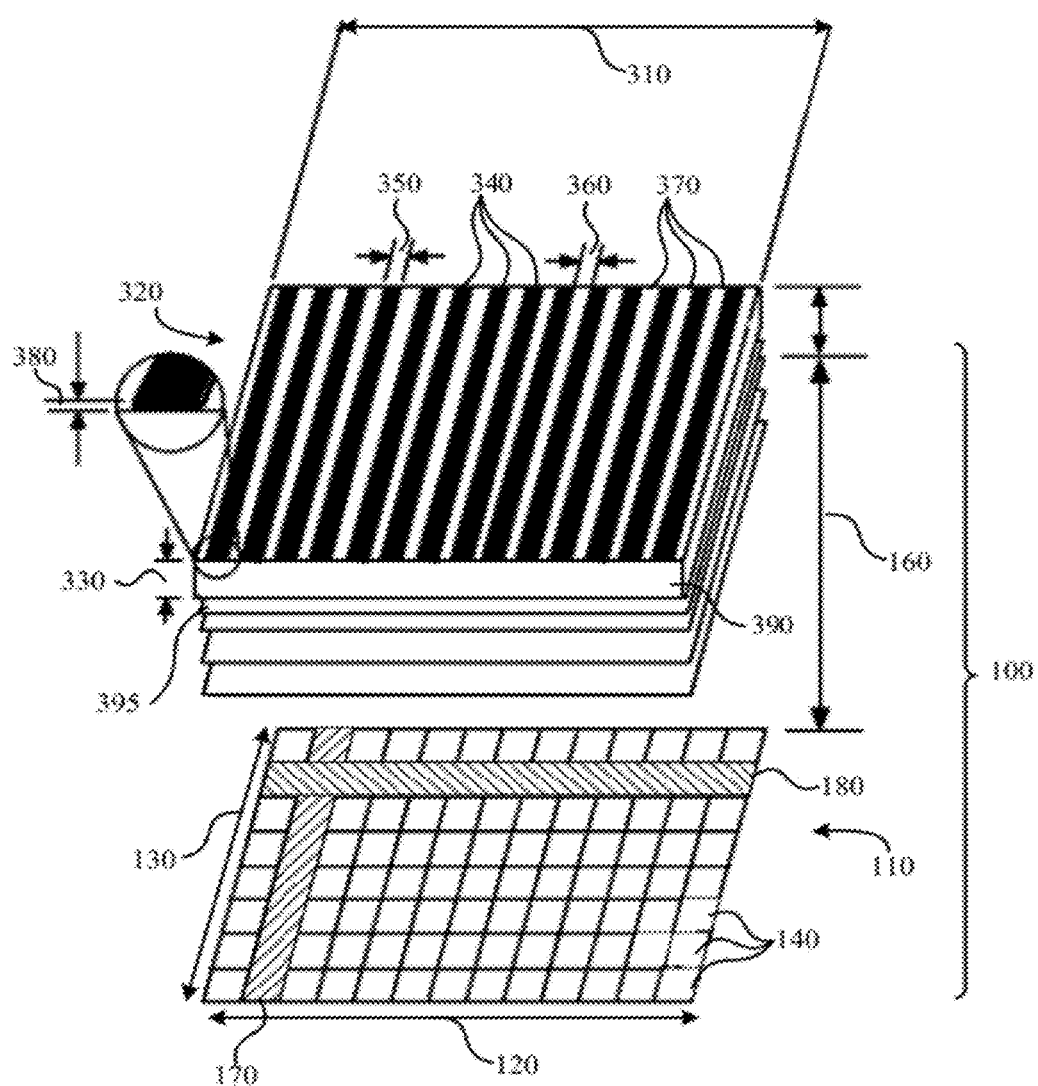
FIG. 3 is a simplified diagram illustrating one embodiment of the invention configured to effect autostereoscopy of horizontal, sometimes referred to as landscape, 3D images.

FIG. 3 illustrates some aspects of the present invention, as well as establishing additional nomenclature for consistent use across the patent application. Shown is a typical parallax barrier-based conversion of a two-dimensional electronic display device 100 into one capable of displaying three dimensional images autostereoscopically.

As described in subsequent paragraphs:

a. The width 310 of a parallax barrier apparatus 320 may intentionally be wider than the horizontal dimension 120 of the underlying electronic display 110.

b. A vertical dimension (not shown) of the parallax barrier apparatus 320 may intentionally be larger than that of the underlying electronic display 110.

c. Barrier lines 340 disposed on the parallax barrier apparatus 320 may intentionally be aligned other than directly over individual columns 170 of pixels (or between such columns 170). The terms "barrier lines" and "opaque barrier lines," as used herein can be defined broadly as structures disposed on or in a substrate to form parallax barrier, where each barrier line 340 is configured to obstruct viewing of at least one column 170 (or row 180, as the case may be) of pixels by one eye of a viewer of the display when the viewer is located at one of a plurality of viewing areas.

d. The width 350 of barrier lines 340 may intentionally vary (not be uniform) from barrier line to barrier line.

e. The width 350 of barrier lines 340 may intentionally vary over their length.

f. The width 360 of the transparent channel apertures 370 separating barrier lines 340 may not be uniform between barrier lines 340 or along their length.

g. Barrier lines 340 may be constructed of material having quantitative thickness 380 and such thickness 380 may intentionally vary as a function of the location of such barrier line 340.

h. Barrier lines 340 may be formed on a substrate 390 having quantitative thickness 330.

i. Additional layers of material and films may be incorporated, such as an adhesive layer 395.

j. Parallel barrier autostereoscopy can be attained via retrofit to existing two-dimensional electronic display devices 100, as well as being integrated with two-dimensional electronic display assemblies by original design.

k. One embodiment of the present invention is realized by effecting barrier lines 340 by various means on a transparent film that can be attached by way of a transparent adhesive to the external (viewing) surface of an existing electronic display device 100, aligning the barrier lines 340 with the underlying columns 170 of pixels 140 to convert such electronic display device 100 to one capable of displaying 3D images autostereoscopically.

l. Another embodiment of the present invention uses a transparent pressure sensitive adhesive that permits a corrected parallax barrier film to be placed on an electronic display device 100 for autostereoscopic viewing of 3D images and subsequently removed to permit unobstructed 2D viewing of the electronic display device 100. An embodiment makes use of certain pressure sensitive adhesives that permit repetitive application and removal to an existing 2D electronic display device 100.

m. Another embodiment of the present invention employs a parallax barrier apparatus 320 that exploits means other than a chemical adhesive to effect attachment to an existing electronic display device 100. These include a means to mechanically hang and align such a transparent sheet from the top of an existing electronic display device 100. Implementations also can include using static electricity to adhere the parallax barrier apparatus 320 to an existing display. Some implementations may benefit from incorporating conductors within or on a surface of the parallax barrier apparatus 320 to which an electrical potential is created, conducted, and applied by an external electric device to create a static charge to help hold the apparatus in alignment and adhere it to the external (viewing) surface of an existing 2D electronic display device 100.

n. Considerable flexibility exists to locate parallax barrier apparatuses 320 distant from the light emitting electronic displays 110 of electronic display devices 100 and to correct for geometric and other optical aberrations that may result from (a) barrier lines 340 not being proximate to, if not in direct contact with, the light emitting electronic display 110 of an electronic display device 100 and (b) layers of material and films intervening between barrier lines 340 and the light emitting electronic display 110 of an electronic display device 100.

Other aspects of the present invention are also described in the following paragraphs that are not depicted in FIG. 3.

Figure 4:
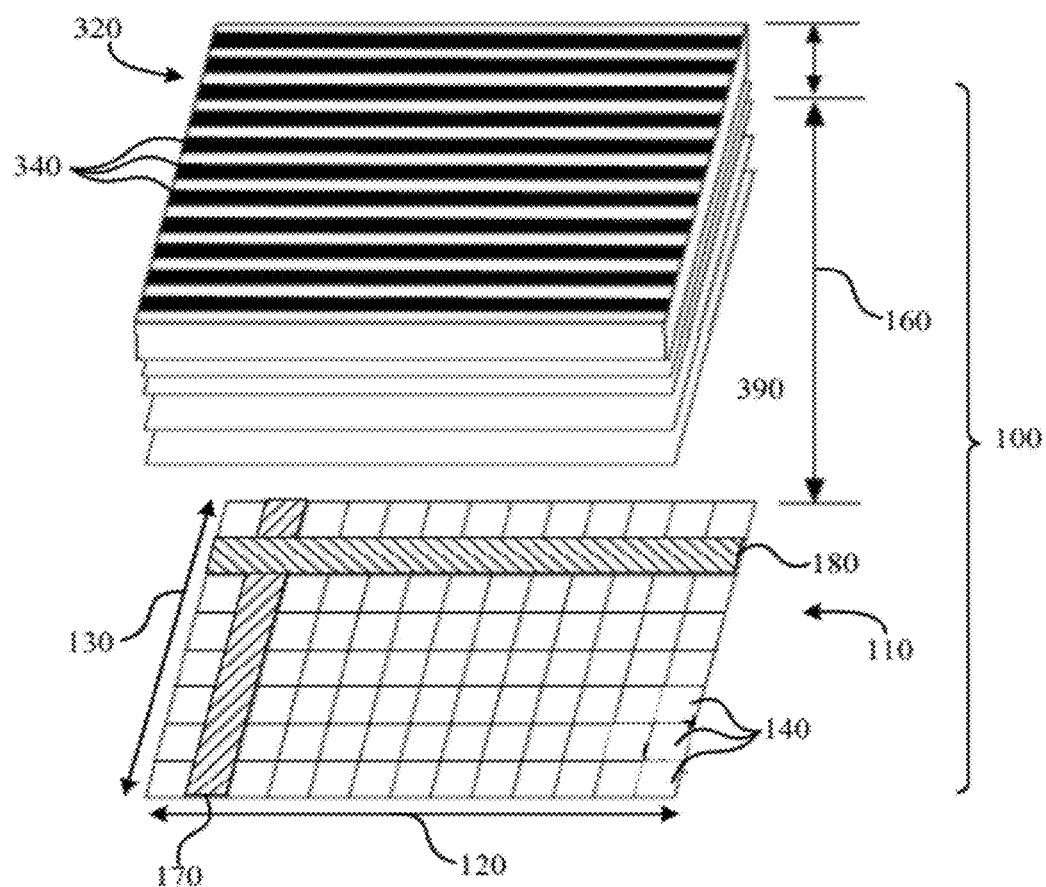
FIG. 4 is a simplified diagram illustrating another embodiment of the invention configured to effect autostereoscopy of vertical, sometimes referred to as portrait, 3D images.

FIG. 4 illustrates that certain electronic display devices, such as handheld tablet computers and smartphones, are designed to be viewed vertically (i.e., "portrait mode") in lieu of (or equally as well as) horizontally (i.e., "landscape mode") and such may benefit from configuring barrier lines 340 of a parallax barrier apparatus 320 in the horizontal dimension 120 to permit vertical autostereoscopic viewing of three-dimension images. Accordingly, aspects of the current invention can be applied equally to a vertical orientation, despite a focus on embodiments utilizing a horizontal orientation in paragraphs that follow. One embodiment of the present invention employs two removable and interchangeable parallax barrier apparatuses 320, one for viewing 3D images horizontally on an existing 2D electronic display device 100 and another for viewing 3D images vertically on the same electronic display device 100.

Figure 5:
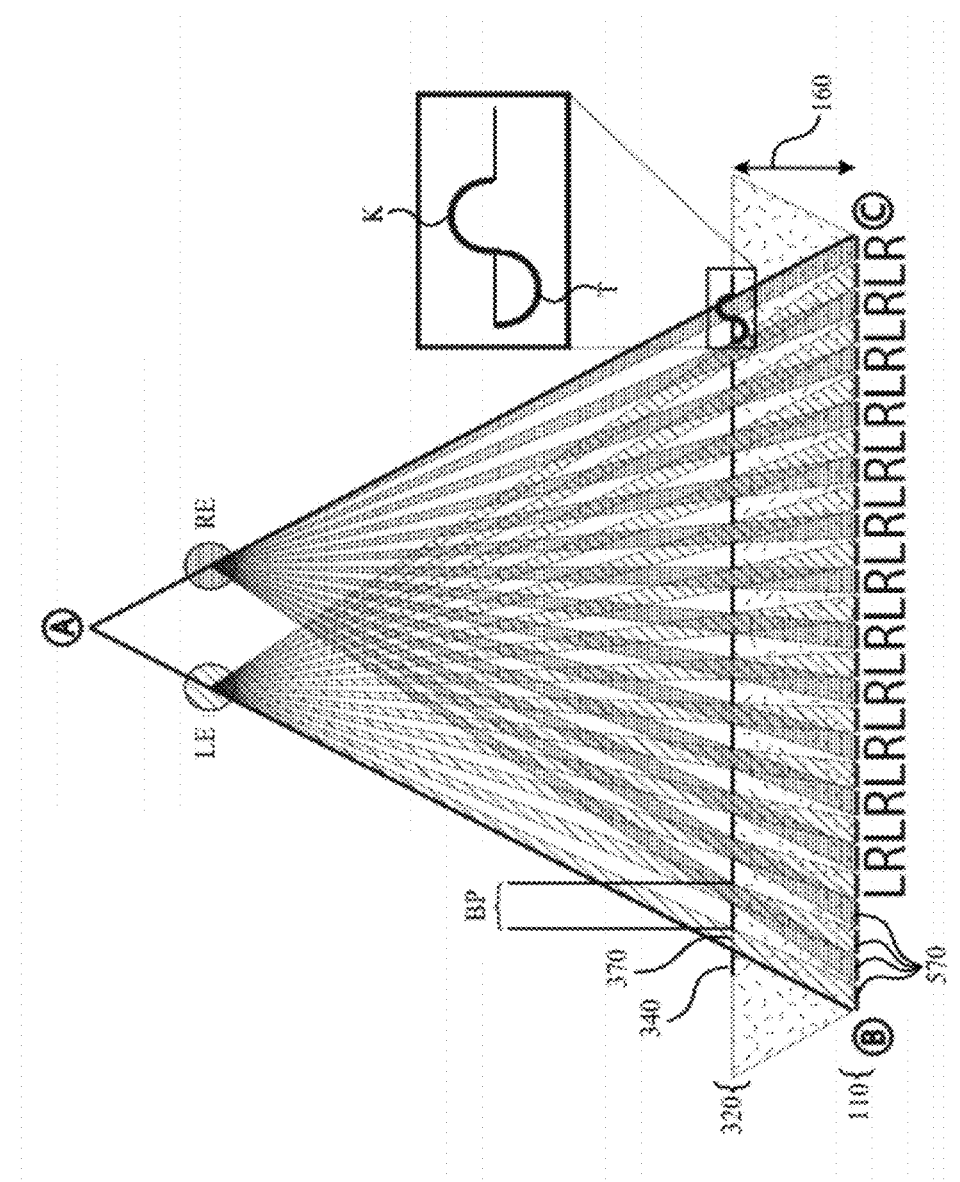
FIGS. 5-8 are simplified illustrations of a horizontal cross-section of embodiments of the invention.

FIG. 5 provides a simplified illustration of a horizontal cross-section of one embodiment of the invention. The parallax barrier apparatus 320 provides autostereoscopic viewing of a light emitting electronic display 110 by providing a series of parallel, opaque barrier lines 340 that effectively obscure or shield each eye from viewing the image seen by the other. For example, FIG. 5 shows a first set of vertical columns of image elements labeled "L" are intended to be seen by a viewer's left eye (labeled LE). This set of vertical columns of image elements is interlaced with a second set of vertical columns of image elements labeled "R," which are intended to be seen by a viewer's right eye (labeled RE). It will be understood that the vertical columns of image elements can each comprise one or more vertical columns of picture elements disposed on an underlying grid of picture elements of the display. These picture elements can incorporate one or more of a variety of technologies, including but not limited to liquid crystal display (LCD), light-emitting diode (LED), plasma and certain flat-screen cathode ray tube (CRT) displays.

FIG. 5 further shows a parallax barrier apparatus 320 having a plurality of opaque barrier lines 340 with an barrier period (BP), defined by the width of one opaque barrier line 340 plus the width of one adjacent transparent channel aperture 370, the transparent channel aperture 370 comprising the space between two opaque barrier lines 340. A trough (T) can be defined as the midpoint of a barrier line 340, and a peak (K) can be defined as the midpoint of the subsequent transparent channel aperture 370. The BP of the parallax barrier apparatus 320 is designed to correspond to the width and period of the underlying columns of image elements to effectively block out a different set of vertical columns 570 of image elements for each eye (here, the vertical columns 570 of image elements can comprise one or more adjacent columns 170 of pixels 140). Each BP therefore comprises an opaque barrier line 340 and a transparent channel aperture 370 corresponding to blocking channels and clear channels, respectively. The opaque barrier lines 340 and transparent channel apertures 370 of the parallax barrier apparatus 320 may result from printing, photographic imaging (such as creating a negative), etching, stripping, ablating, lithography, photo-lithography, or otherwise formed or attached to a substrate coupled within or attached to an electronic display device 100. The substrate can comprise an optically-transparent material such as any number of plastics, other polymers, or glassy materials.

FIG. 5 further illustrates that parallax barrier apparatus 320 should be separated from and not in contact with the electronic display 110 comprising the pixels 140. As described in further detail below, parallax barrier apparatus 320 separation can be one BP or greater from the light emitting surface of the electronic display. This is signified by the gray trapezoid in FIG. 5 representing the distance 160 between the plane of the electronic display 110 and the approximately parallel plane of the parallax barrier 320.

FIG. 5 further defines a basic viewing triangle ABC, from which many parallax barrier apparatus 320 functions are derived in subsequent paragraphs. The viewing triangle is defined by the outer edges of the source B-C and the intersection of the two lines A, extended from B through LE and C through RE, thus ABC.

Figure 6:
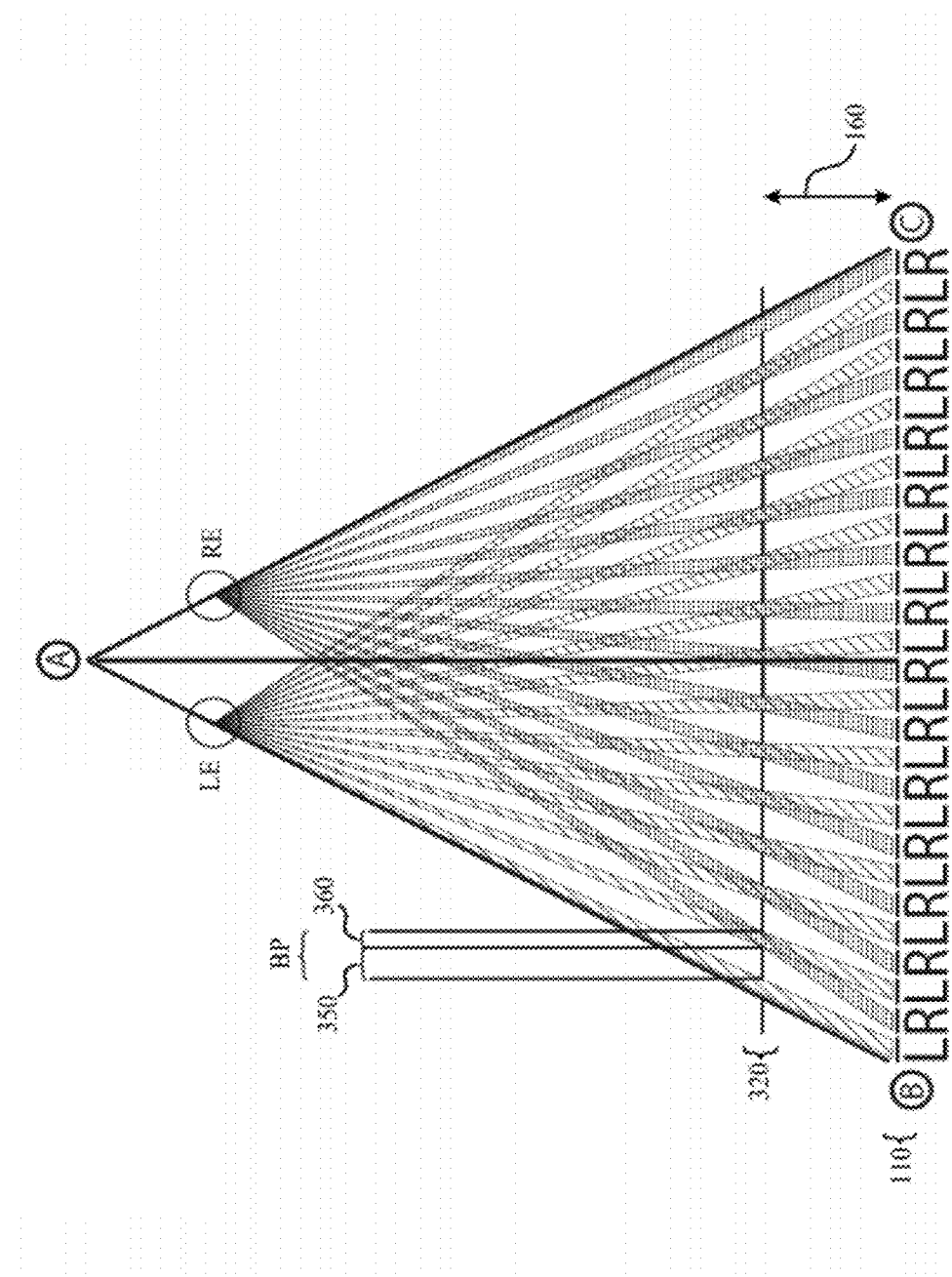

FIG. 6 illustrates the concept of barrier line widening. That is, without taking other factors into account as described below, the width 350 of barrier lines 340 may be increased to comprise more than 50% of the width of a BP. For example, because a signal from a blocking channel may "spill over" into a clear channel, the blocking channel may be widened—corresponding to increases in the width of the opaque barrier lines 340. The magnitude of "spill-over" can be affected by the distance 160 between the plane of the light emitting electronic display 110 and the approximately parallel plane of the parallax barrier 320, as well as light scattering and refraction effects resulting from intermediate layers of largely light transmissive material between such planes (as signified by the gray trapezoid shown in FIG. 5). According to some embodiments, increasing the width 350 of the barrier lines 340 by 5-10% is sufficient to stop this effect. It will be understood, however, that the penalty of widening the barrier lines 340 reduces the overall light-emitting efficiency of the electronic display 110, so it will be appreciated that a minimal increase to prevent light spillover is preferred. One embodiment of the current invention gives rise to wider barrier lines 340 near the center of the parallax barrier 320, width 350 of the barrier lines 340 becoming narrower toward the horizontal extremes of the parallax barrier apparatus 320 to restore the light emission otherwise reduced, yet maintain uniformity of light emission across the electronic display devices 100 equipped with a parallax barrier 320. According to one embodiment, for example, the parallax barrier apparatus 320 blocks 51.28% of the light emitted from the electronic display 110.

Figure 7:
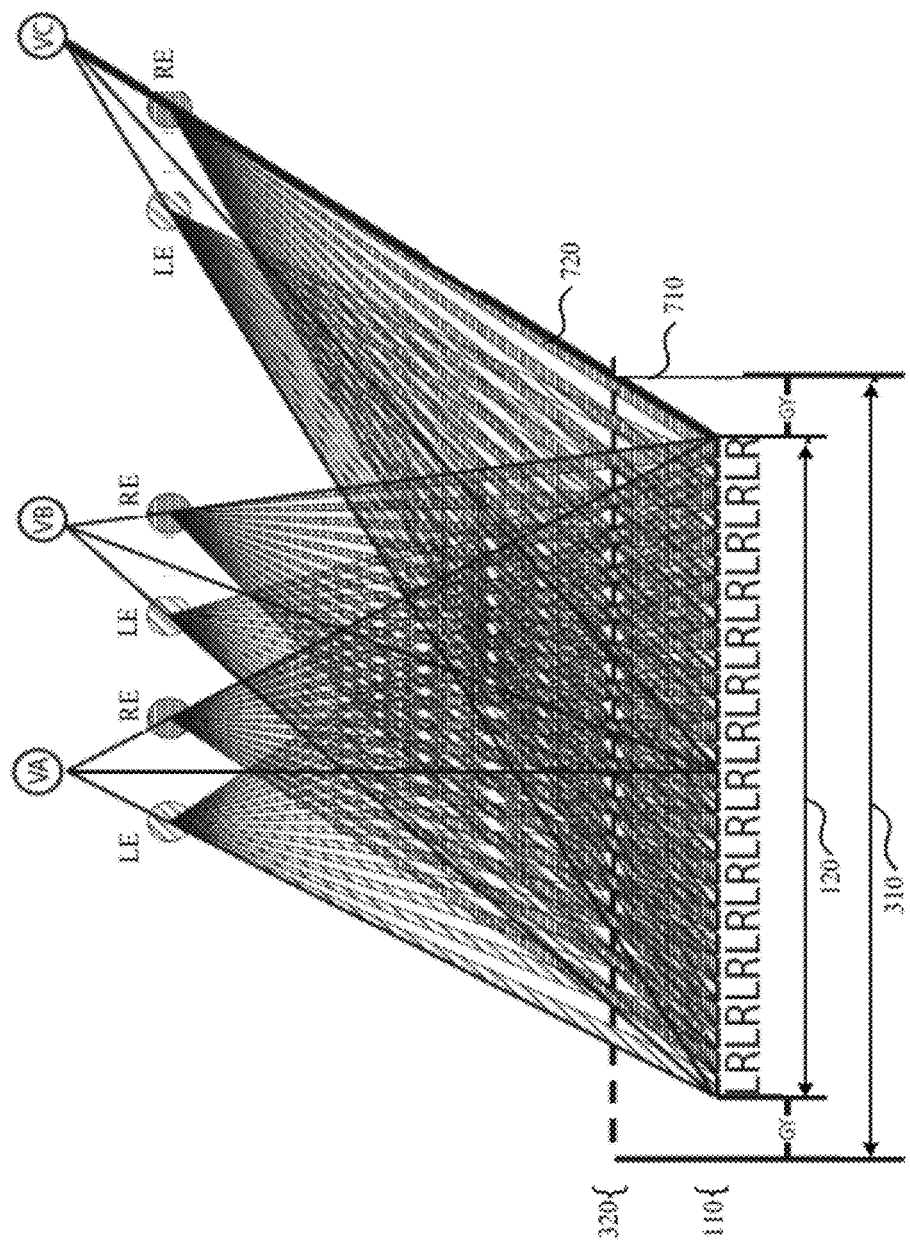

FIG. 7 illustrates another aspect of the invention, according to some embodiments. The parallax barrier apparatus 320 can have a width 310 that extends laterally for a distance 2GY beyond the horizontal dimension 120 of the electronic display 110 so not to constrain 3D viewing angle to less than that available via the underlying 2D electronic display 110. (Here, GY is defined by a distance on each side of the electronic display 110 beyond the horizontal dimension 120 of the electronic display 110) In so doing, not only is autostereoscopic viewing of the entire electronic display 110 provided to viewers VA and VB located in front of the display, as shown in FIG. 7, but also to viewer VC, located at an angled position relative to the display. Viewing angle thus remains constrained by the device border 710 (as shown by shadow line 720), not the parallax barrier 320, as long as the width 310 of the parallax barrier apparatus 320 appropriately exceeds the horizontal dimension 120 of the electronic display 110.

Figure 8:
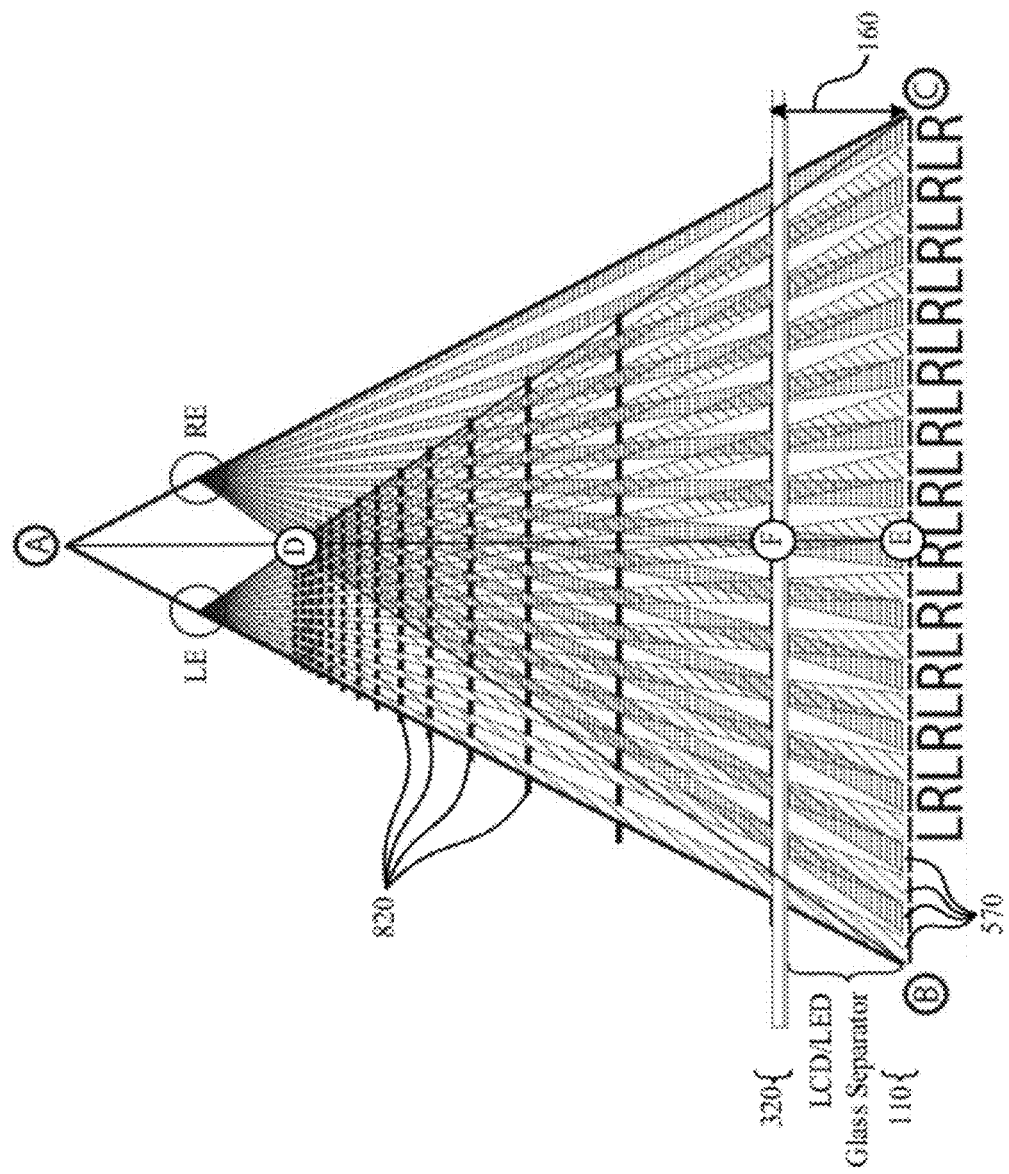

FIG. 8 illustrates a relationship between the scale of the barrier lines 340 and transparent channel apertures 370 of the parallax barrier apparatus 320 and the distance 160 between the plane of the electronic display 110 and the approximately parallel plane of the parallax barrier 320, according to some embodiments. For instance, as discussed above, in order to provide an autostereoscopic image to a viewer, the parallax barrier apparatus 320 can be configured such that the plurality of barrier lines 340 block a first set L of vertical columns 170 of image elements of the electronic display 110, showing a first image, from being seen by the right eye RE of the viewer.

The barrier lines 340 also block a second set R of vertical columns 170 of image elements of the electronic display 110, showing a second image, from being seen by the left eye LE of the viewer. Thus, as the distance 160 between the plane of the electronic display 110 and the approximately parallel plane of the parallax barrier apparatus 320 increases, the width 350 of the barrier lines 340 and the width 360 of transparent channel apertures 370 (as shown in FIG. 6) decrease proportionally, hence the BP decreases (and the spatial frequency of the barrier lines 340 increases). It should be noted that, unlike lenticular autostereoscopic displays described above, a parallax barrier apparatus 320 can be situated above the underlying display separated by a distance 160. In some embodiments the distance 160 is greater than or equal to BP, where the maximum size of BP is twice the image element pitch of the underlying display. (The image element may be made up of more than one picture element, or, in other words, columns 570 can comprise multiple adjacent columns 170 of pixels 140). This is why the present invention can be materially superior to lenticular approaches, especially for retrofitting 2D displays to display 3D images.

FIG. 8 also defines a safe viewing triangle BCD where, by way of the present invention, 3D images can autostereoscopically appear to float between the parallax barrier apparatus and a viewer's eyes LE and RE (i.e., float in space in front of the screen) as long as such images do not appear to touch or extend beyond the borders of lines BD or CD. In FIG. 8, E is defined as the midpoint of the line between B and C, D is defined as the intersection between line LE-C and RE-B, and F is defined as a point along line DE at a distance 160 from point E. 3D images appearing to touch or extend beyond lines BD or CD may result in artifacts that can destroy the perception of such an image floating in space. This is a limitation of all autostereoscopic displays, which limits (establishes boundaries on) the 3D content that can be successfully displayed by such.

Displays such as computer monitors, TVs, cell phones, tablet computers, and other products typically can have a number of transparent layers situated above the optically active image surface. These will at a minimum protect the underlying picture elements of the display from impact and/or other dangers. Because different types of displays have different types of layers, the distance between the underlying picture elements and the outer surface of the protection layers (therefore separating the vertical columns of image elements from the parallax barrier apparatus barrier lines) can vary with each type of display. Thus, a parallax barrier apparatus designed to adhere to the outer surface of a protection layer will need to be configured to take this distance into account. Two types of displays with similar size and resolution of underlying picture elements may therefore need two differently-configured parallax barrier apparatuses.

Additionally, as distance 160 increases, the period BP can be scaled in a progression along the lines between E and D, such that an equal number of pairs remain between each eye and the electronic display 110. This can double the special frequency of barrier lines 340 from F to D, reducing the BP by half. These scaled parallax barriers 820 at increasing distances are shown in FIG. 8.

Figure 9:
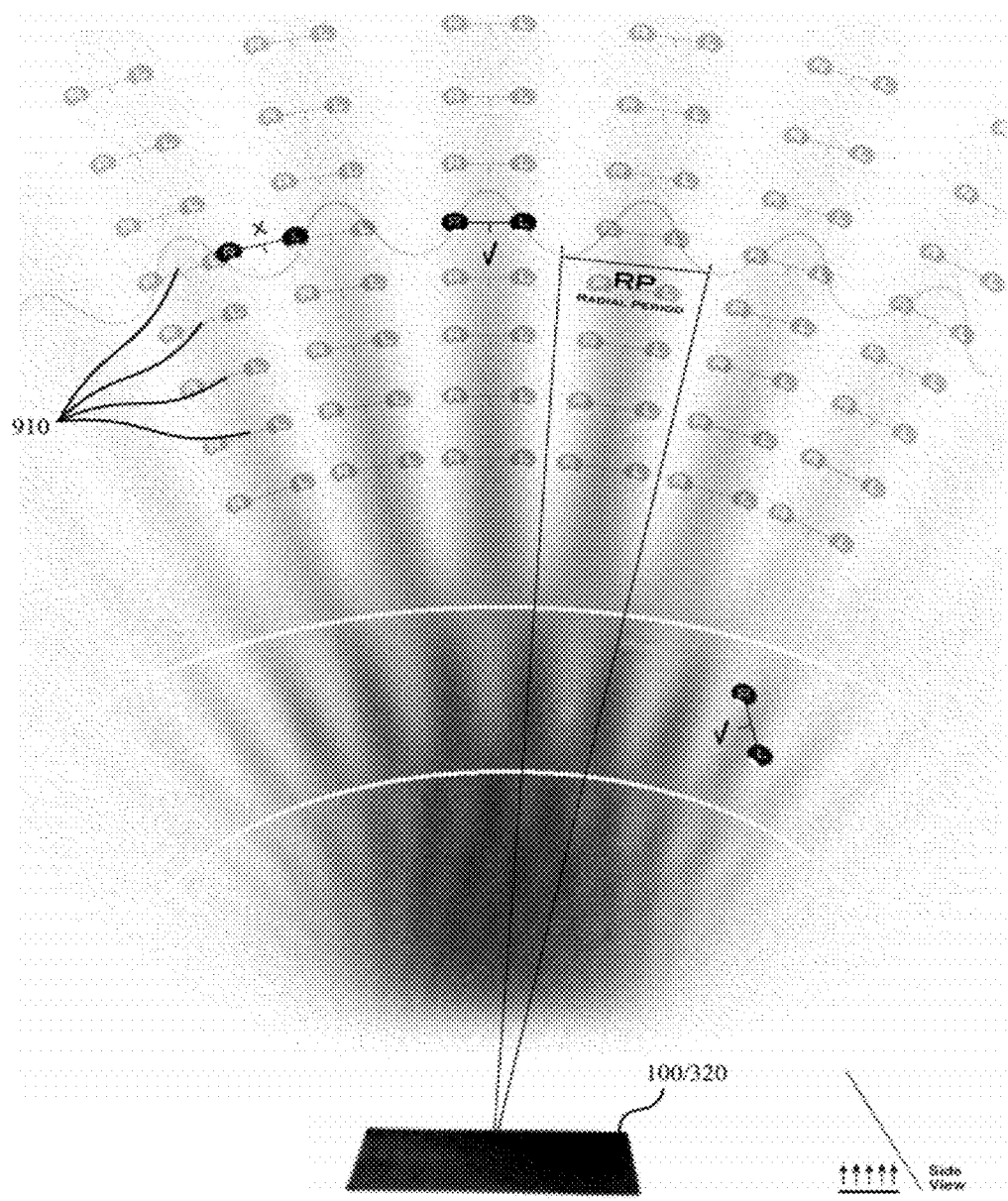
FIG. 9 is an inverted, overhead view of a projection of light from a display utilizing an embodiment of the present invention.

FIG. 9 is an inverted overhead view of an electronic display device 100 equipped with a parallax barrier apparatus 320 as described herein, illustrating that the present invention forms particular viewing areas, or "pools" 910 in which a viewer may best view the display in an autostereoscopic manner. The check (✓) marked viewing positions signify best "in-pool" viewing locations. A viewer positioned at X in FIG. 9 would see a reversed 3D image, where objects that are supposed to appear close, appear distant instead, and vice versa. Viewing pools 910 can extend for some considerable distance from the plane containing the barrier lines 340. Thus, a wide range and number of viewing angles and distances are made possible by the present invention.

Viewing pool size and distance from the barrier line plane are controlled by varying the location and width 350 of the barrier lines 340 (and transparent channel aperture 370 location and width 360, accordingly) to compensate for geometrical and optical aberrations, effecting, by way of examples, focus and convergence. For example, the BP can have a shorter width than the width of two corresponding vertical columns 570 of image elements of the display. Not only is this a function of the barrier lines 340 being located at some distance 160 from the underlying vertical columns 570 of image elements of the electronic display 110, as discussed above, but the BP's shorter width (i.e., increased spatial frequency) allows images to "converge" at these viewing pools 910. These viewing pools 910 can be adapted for different monitors, TVs, cell phones, and other screen types according to desired or expected viewing distances. According to one embodiment, the BP of the parallax barrier apparatus 320 is 99.42% of the width of two corresponding vertical columns 570 of image elements of the electronic display 110.

FIG. 9 introduces a radial period (RP) as the angular extent of a viewing pool 910, from luminance trough to luminance trough. This radial period will be used in subsequent paragraphs defining additional geometric and optical corrections.

Viewing pool size, determined by RP, can take into account average interpupillary distance of a viewing population and the extent to which a viewer might rotate his or her head, while viewing an autostereoscopic 3D image.

Figure 10:
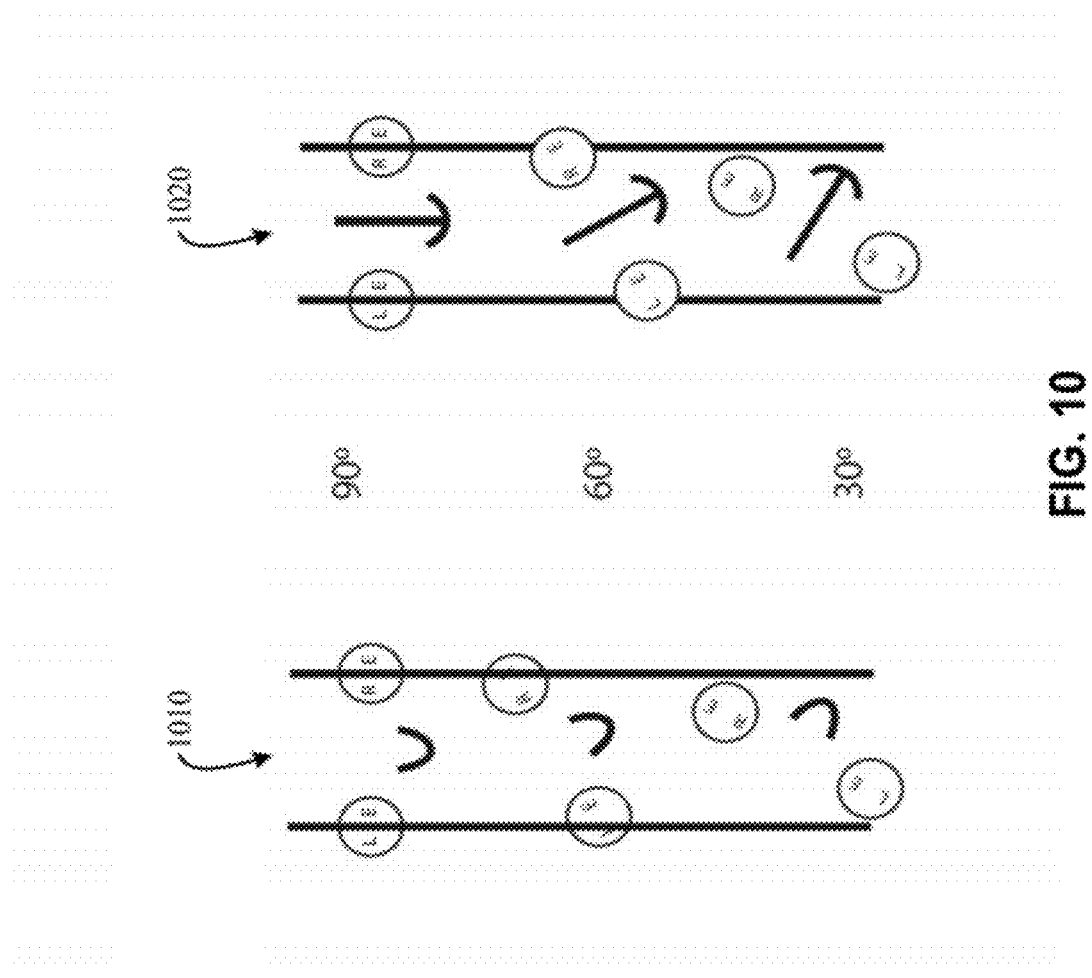
FIG. 10 is a simplified diagram illustrating how different head positions result in diminished apparent interpupil distances relative to a perpendicular to a screen being viewed.

FIG. 10 is an illustration of simplified overhead views 1010 and facing views, showing how the present invention can take into account viewer head roll and yaw (Tait-Bryan angles) with respect to the perpendicular to an electronic display 110 being viewed, when designing viewing pools 910 for a particular display and application. Head pitch has no effect on effective interpupillary distance.

Figure 11:
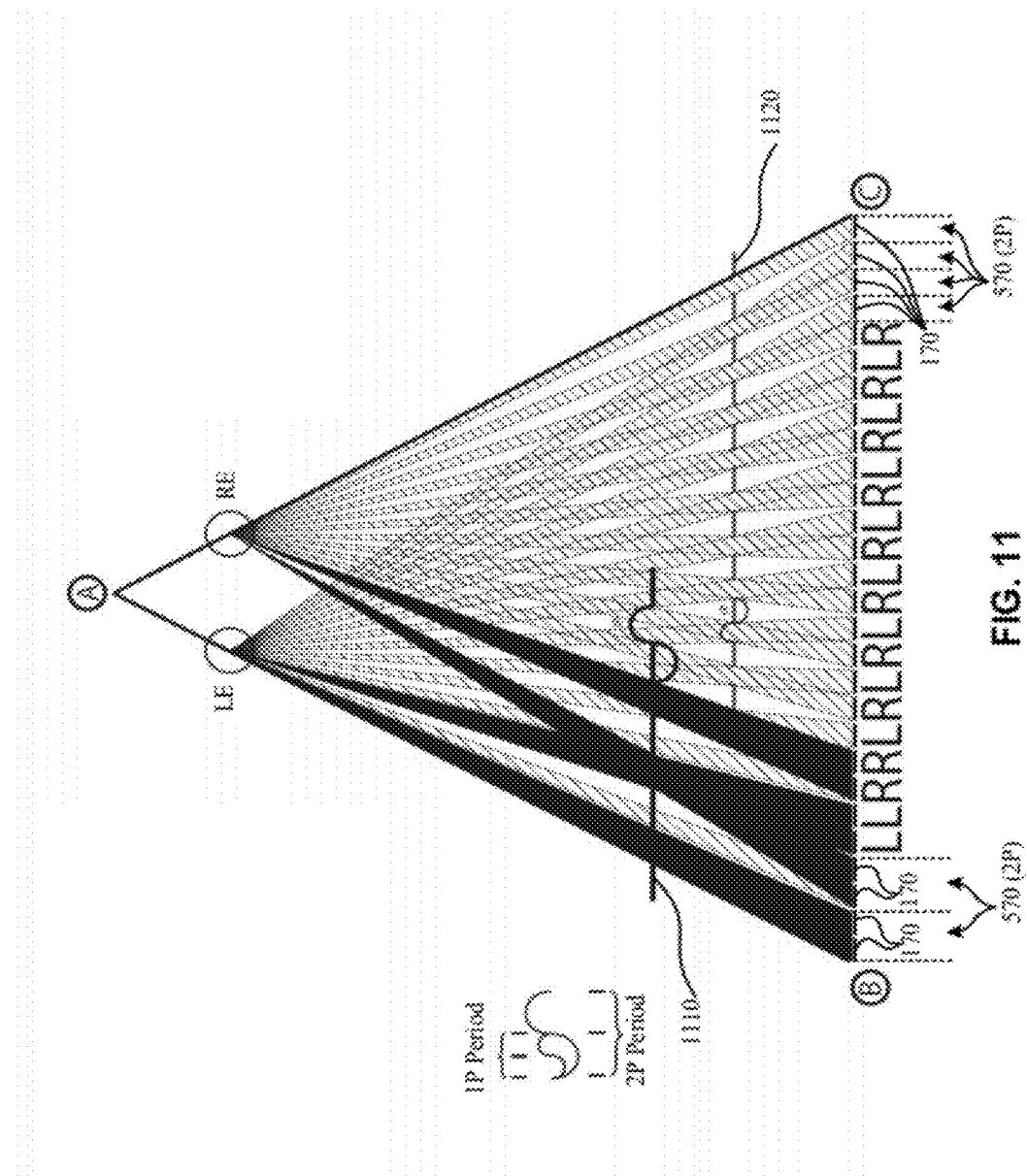
FIGS. 11-14 are simplified illustrations of a horizontal cross-section of embodiments of the invention.

FIG. 11 illustrates how viewing pools 910 can be moved to greater distance away from the screen. Because the opaque barrier lines can have a limited effect to a viewer as the viewer's distance from the display increases, the opaque barrier lines 340 can be widened. More specifically, because the resolution of the human eye is insufficient to resolve a barrier line 340 of a certain thickness beyond a limited distance, widening barrier lines 340 and combining multiple vertical pixel columns 170 with integer multiple BPs enables stereo separation over greater distances. The width of the underlying vertical columns 570 of image elements can be increased, for example, from one pixel column 170 wide to two, three, four, etc., and the width of the opaque barrier lines can be increased accordingly. FIG. 11 illustrates both a 1P configuration 1120 (i.e., barrier lines 240 are configured to obscure vertical columns 570 of image elements that are 1 pixel column 170 wide) and a 2P configuration 1110 (i.e., barrier lines configured to obscure vertical columns 570 of image elements 2 pixel columns 170 wide). Other configurations (e.g., 3P, 4P, etc.) can follow the same naming convention. Note that the information displayed by the vertical columns 570 may not be changed when a wider barrier is employed (e.g., employing a 2P vs. 1P configuration). Thus, the distance of the viewing pools can be increased while preserving the autostereoscopic function of the parallax barrier apparatus 320.

Figure 12:
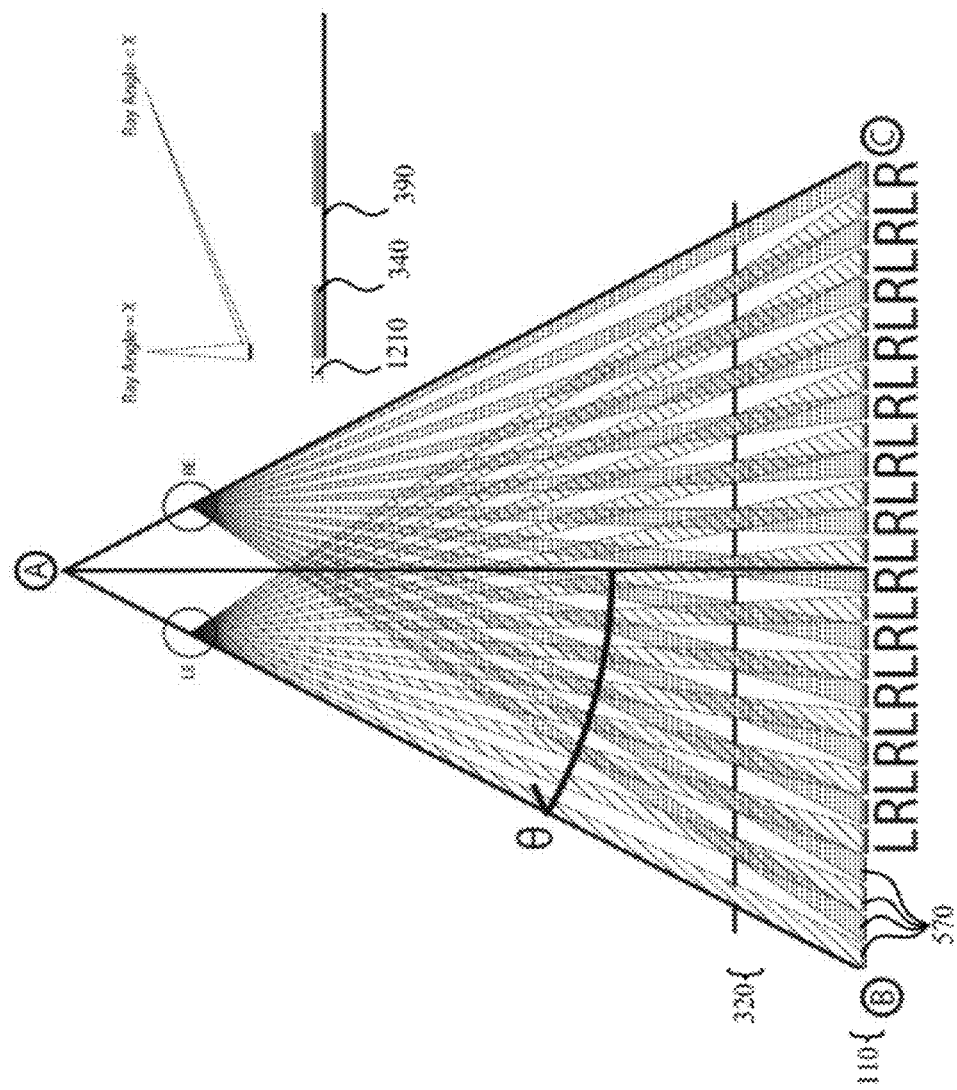

FIG. 12 illustrates embodiments compensating for increasing angles of viewing toward the edges of an electronic display 110, as a function of viewing distance. Without correction, transparent channel aperture width will appear to diminish as a function of angle Θ, causing the electronic display 110 to appear increasingly darkened toward the edges. Additionally, as actually distance to the electronic display 110 increases, the progressive darkening is rapidly increased by the inverse square law. One embodiment of the present invention is to compensate for this by narrowing the opaque barrier lines 340 with increasing Θ, which results in commensurate widening of adjacent transparent channel apertures 370. A parallax barrier apparatus 320 can be further configured to take into account these angles. Because the effective width of both the barrier lines 340 and the underlying vertical columns 570 of image elements change as a function of viewing angle, the width of the barrier lines 340 can be varied to account for different viewing angles. For instance, an barrier line 340 viewed at an angle may not block an underlying vertical column 570 of image elements as well as a barrier line 340 of the same width seen at little or no angle.

FIG. 12 further illustrates a related concept. For example, a barrier line 340, can comprise a material (e.g., ink, metal, etc.) that has a thickness 1210 above a substrate 390 on which the barrier line 340 is disposed. The thickness can be a factor to a viewer viewing the electronic display 110 at certain angles. As discussed in further detail below, barrier lines 340 can be adjusted to compensate for thickness 1210.

Figure 13:
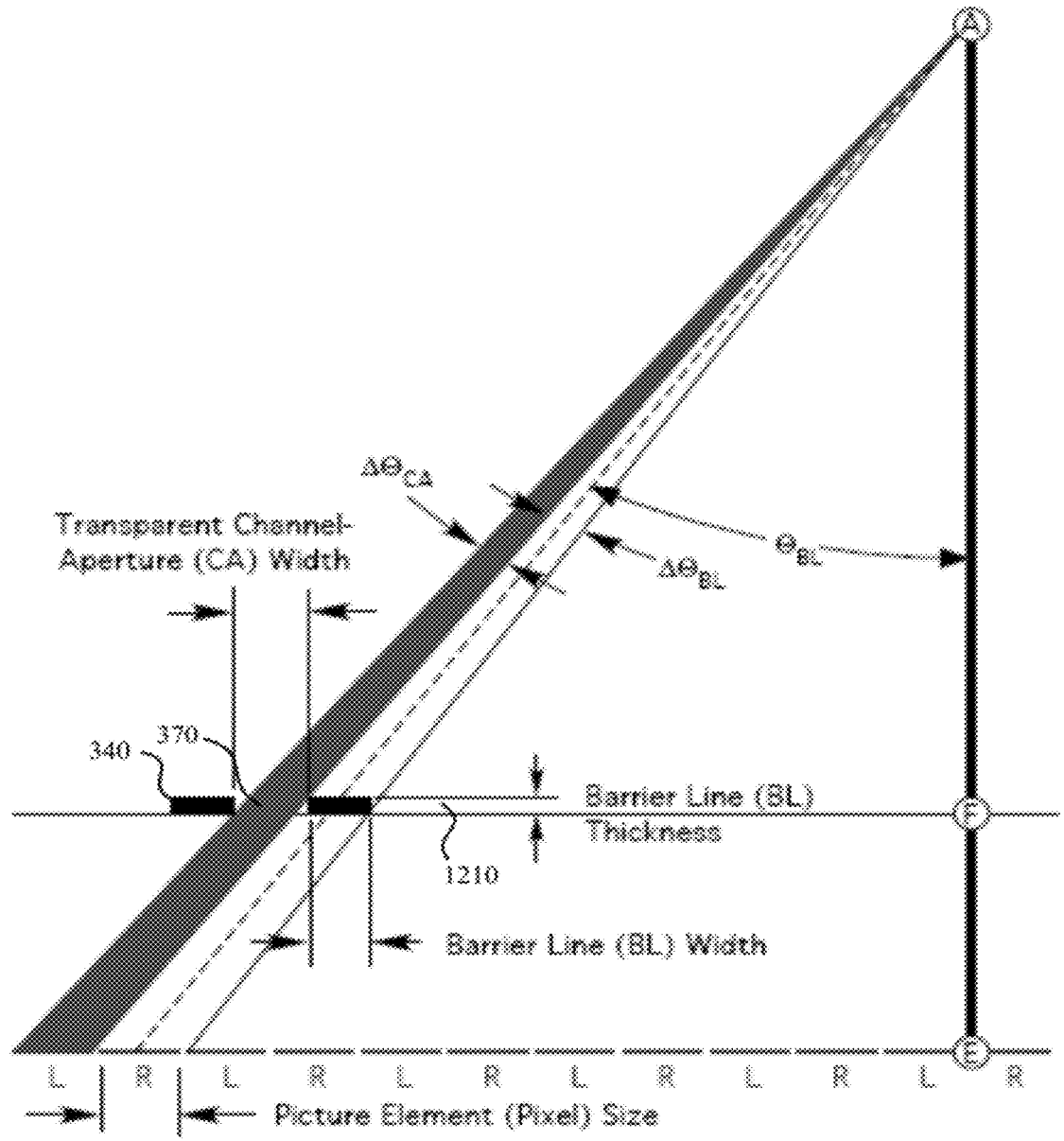

FIG. 13 illustrates the geometry involved. Here, CA represents the width 360 of a transparent channel aperture 370, and BL represents the width 350 of a barrier line 340. As Θ increases (to $\Theta_{BL}$ in the illustration), $\Delta\Theta_{CA}$ would normally diminish. Barrier line width is reduced, diminishing $\Delta\Theta_{BL}$ to increase $\Delta\Theta_{CA}$ to restore image element luminance back to point A, maintaining the same BP in the process. For example, the angle $\Theta_{BL}$ between an averaged position of viewing A (located at a point between the viewer's eyes) and an edge of the display might be 7.5 degrees. According to other applications in which smaller displays are utilized, this angle can be smaller. Yet other applications present an angle of 10-15 degrees or more for larger displays.

FIG. 13 also illustrates that the thickness 1210 of a barrier line 340 can enter into the equation as $\Theta_{BL}$ increases. This necessitates a widening of the width 360 of transparent channel apertures 370 and narrowing barrier line width to adjust for the thickness of the material, giving rise to barrier line thickness 1210 (which can also be defined by a dimension extending perpendicularly outward from the parallax barrier apparatus 320 toward a viewer in front of the display). Certain embodiments of the present invention, for example take into account printing ink type, thickness and build-up thickness resulting from multiple printing strikes.

Thus, the width of the opaque barrier lines at certain positions on the parallax barrier apparatus can vary as a function of viewing angle, line thickness, and distance of the parallax barrier from the underlying vertical columns of image elements.

Figure 14:
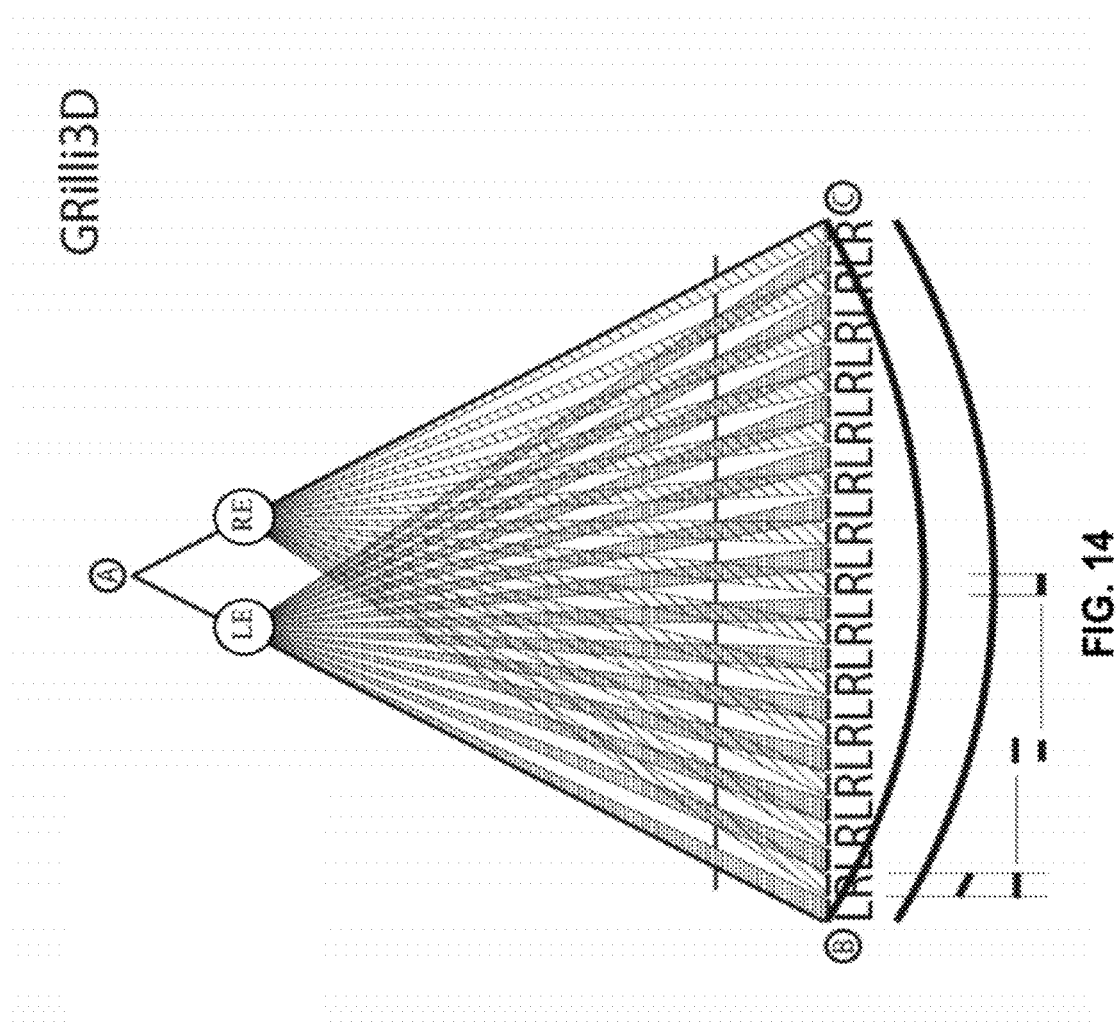

FIG. 14 illustrates that, according to some embodiments, the parallax barrier apparatus 320 can account for cylindrical aberrations. The underlying vertical columns 570 of image elements of the electronic display 110 are not equidistant from an averaged position of viewing A. The width 350 of the barrier lines 340 can therefore be adjusted to take this into account. For instance, as a function of an expected or preferred position of a viewer A, the barrier lines 340 of the parallax barrier apparatus 320 can be adjusted as if the underlying vertical columns 570 of image elements from edges of the display B and C were "projected" back on an arc from B to C having a radius of the distance from A to B. Accounting for cylindrical aberrations in this manner will cause the line width of the barrier lines 340 to vary across the parallax barrier apparatus.

Figure 15:
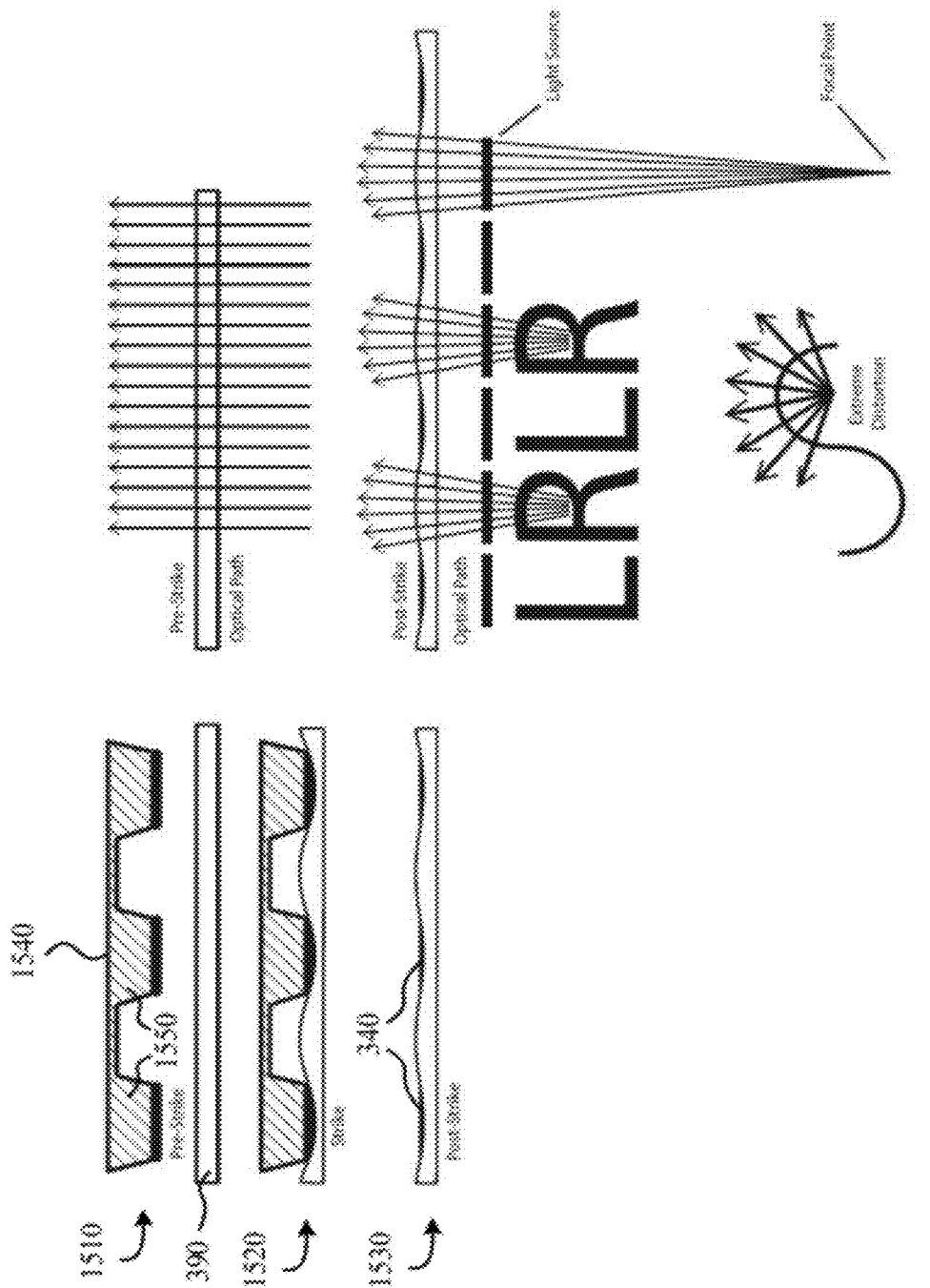
FIG. 15 is a simplified cross-sectional profile of a process of printing opaque barrier lines on a flexible plastic substrate, according to an embodiment.

Methods of a manufacture of a parallax barrier apparatus 320 can also impact the optical performance of a parallax barrier apparatus 320. As discussed further below, according to some embodiments of the present invention, a parallax barrier apparatus 320 may be formed by printing barrier lines on a plastic substrate 390, which can be flexible. FIG. 15 shows a simplified cross-sectional profile of such a process.

In an initial step 1510, ink is provided on a printing surface 1540 configured to print the barrier lines 340 of the parallax barrier apparatus 320 on a plastic substrate 390. To create the barrier lines 340, the printing surface may comprise raised features 1550 corresponding to the barrier lines 340. In a second step 1520, the printing surface 1540, such as a printing plate, can then strike the plastic substrate 390 to apply the ink to the plastic substrate 390. Depending on the types of inks and plastics involved, this process may need to be repeated several times to ensure adherence of the ink to the plastic substrate 390, as shown in step 1530.

The striking of the plastic substrate 390 in the printing process may alter the physical characteristics of the plastic substrate 390. Lateral stretching of the substrate can occur, for example, and may need to be accounted for. Additionally, "peaks" and "valleys" may be formed on the surface of the plastic substrate 390. The curvature of the peaks, formed between the opaque barrier lines as illustrated in FIG. 15, can result in a mild lenticular effect that can complement the barrier lines 340. In other words, the focal effect of the peaks can increase the signal separation caused by opaque barrier lines 340, adding to the overall effectiveness of the parallax barrier apparatus.

It can be noted that, although embodiments of the present invention contemplate various materials comprising the barrier lines 340 (such as etched metals or polymers), ink printing in the manner described above can be preferable for at least two reasons. First, the printing process is typically much cheaper and faster than alternative means for creating barrier lines 340. Such alternative means can include photolithographic and/or chemical etching means that can be much more expensive than ink printing. Second, the use of some inks, such as water-based vegetable inks, in a printing process can have a much lower environmental impact than the use of chemicals involved in an etching process. Even so, some embodiments can utilize etched metals and/or other materials, which can provide more accurate signal blocking.

Figure 16A:
Figure 16B:
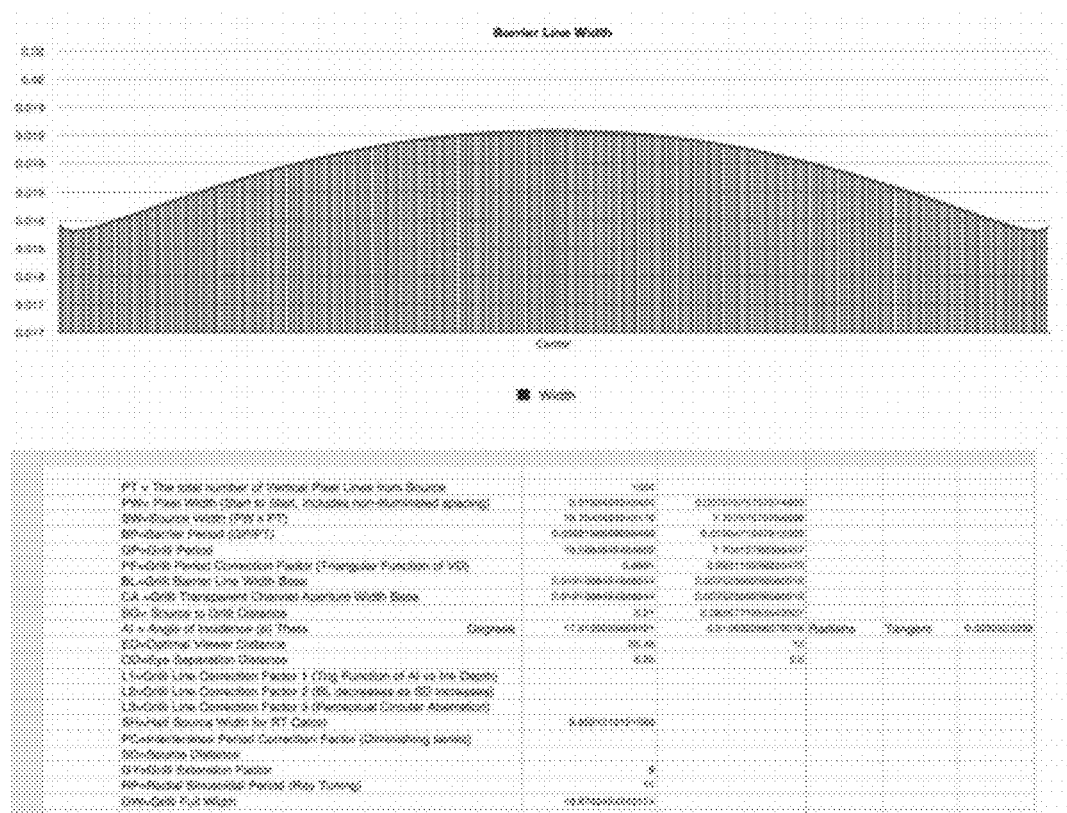

FIGS. 16A-C illustrate the calculation of graph of barrier widths in accordance with one embodiment, via a spreadsheet, taking into account various constants and variables. The non-uniformity in this embodiment is designed to primarily view from in front of the display, yet the tapering off on the sides helps enhance the view from the side of the display. It also contains several other enhancements, like the focusing effect caused by the pressures of impression. Depending on desired functionality and performance, adjustments to the width 350 of the barrier lines 340 to compensate for viewing angle and cylindrical aberrations as described herein can vary. Those skilled in the relevant arts will appreciate how such adjustments can be determined, and will understand how overall width 350 can be increased or decreased to balance signal separation with efficiency.

Figure 17:
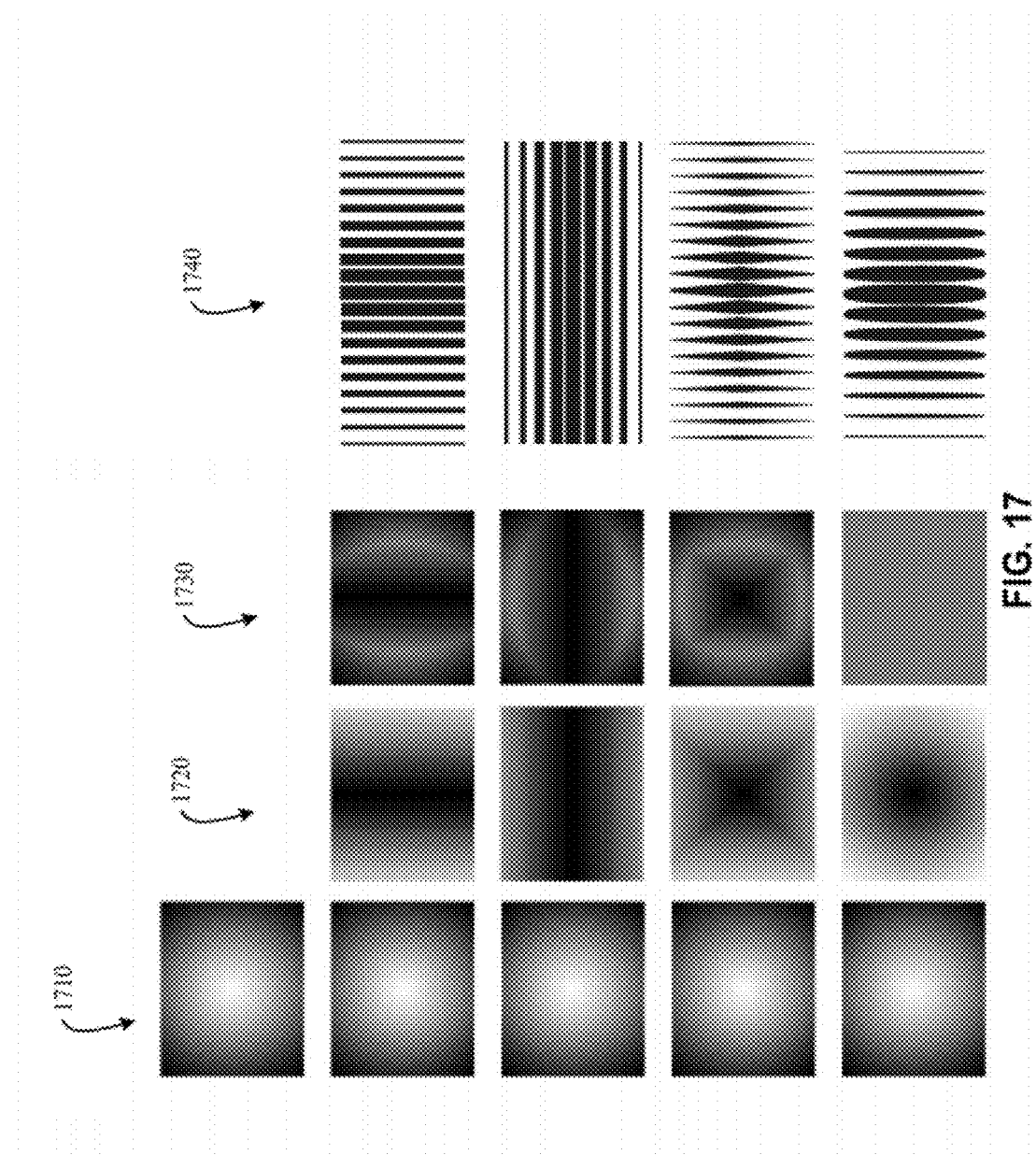
FIG. 17 is an illustration showing how embodiments of the invention can compensate for cylindrical aberrations.

Adjustments can include complex cylindrical (vertical as well as horizontal axis) and circular correction, as illustrated in FIG. 17. The pictures shown on in FIG. 17 illustrate light reception at a point central to and above the plane of an emissive source, which diminishes radially as a function of increased distance. Various correction methods partially compensate for this factor, including multiple types of cylindrically-based corrections. A first column of pictures 1710 illustrates an exaggerated monopoint view of an emissive source. A second column of pictures 1720, illustrate (from top to bottom) cylindrical correction (vertical cylinder), cylindrical correction (horizontal cylinder), cross-cylindrical correction (biaxial cylinders), and circular correction. Each row of a third column of pictures 1730, illustrates the corresponding result of the correction in the second column of pictures 1720. Finally, a column of barrier examples 1740 illustrates corresponding methods of correction. (The barrier examples 1740 are exaggerated to illustrate the method of correction, and are not to scale.)

Figure 18:
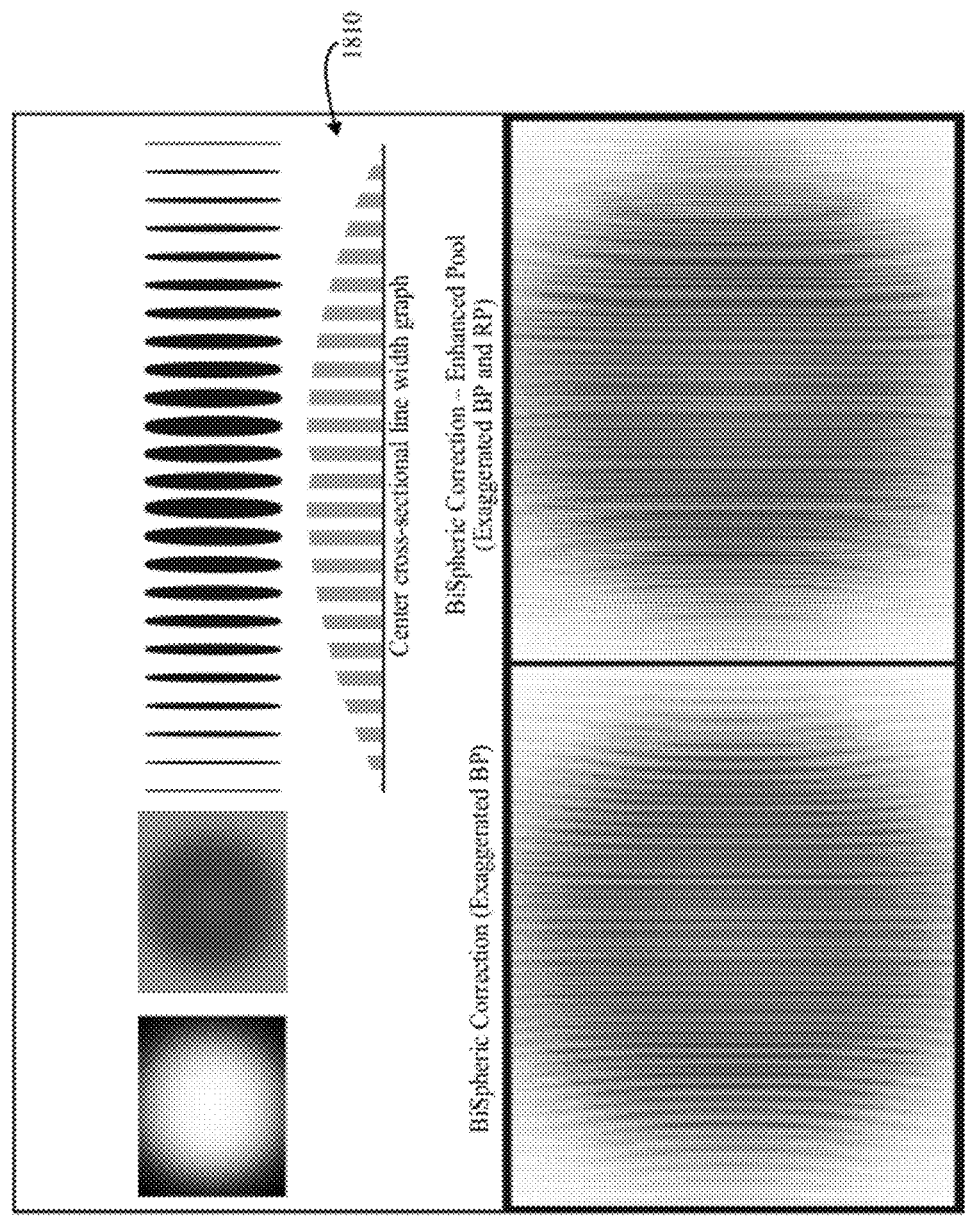
FIG. 18 is an illustration showing how embodiments of the invention can compensate for bispheric aberrations.

In a similar manner, FIG. 18 illustrates bispheric correction. The lower left illustration of FIG. 18 illustrates a more optimal dual point solution, according to some embodiments, with BP widths exaggerated to make the function more obvious. The lower right illustration of FIG. 18 exaggerates radial periods (RP) in addition to BP widths, a factor in refining viewing pools 910 as previously discussed. FIG. 18 further includes a center cross-sectional line width graph, further illustrating the line widths of the shown method of correction.

Figure 19:
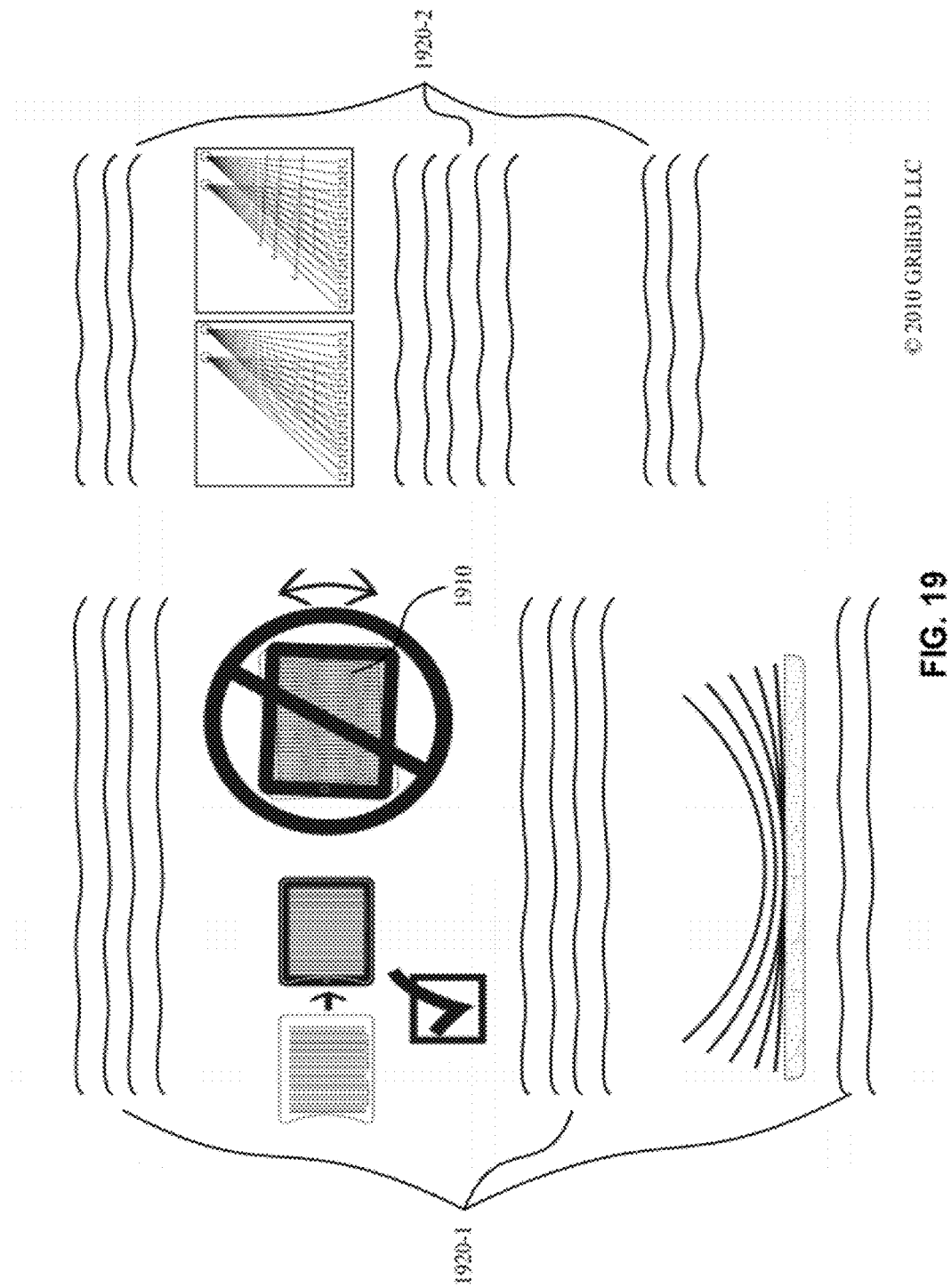
FIG. 19 illustrates an example installation instruction sheet for an embodiment of a parallax barrier apparatus disposed on a flexible substrate.

FIG. 19 illustrates an example installation instruction sheet for a parallax barrier apparatus 320 disposed on a flexible substrate 390. Text 1920 can include instructions 1920-1 of how to apply the parallax barrier apparatus 320 to various types of displays, as explained above, as well as a brief explanation 1920-2 of how the parallax barrier apparatus 320 works, warnings, and care. Applying the parallax barrier apparatus 320 can be done in a variety of ways, and the parallax barrier apparatus 320 can have an adhering surface enabling the parallax barrier apparatus 320 to be removed and reapplied if the parallax barrier apparatus 320 is not aligned properly. A parallax barrier apparatus 320 can be configured to be aligned to an electronic display device 100 such that the barrier lines 340 are as parallel as possible to the vertical pixel columns 170 of the underlying electronic display 110. Underlying images for right and left eyes may be provided electronically on the electronic display 110—such as interlaced light and dark images in one embodiment—to facilitate the application of the parallax barrier apparatus 320. Gross improper rotation, will result in a moiré pattern 1910, as illustrated in FIG. 19.

Figure 20:
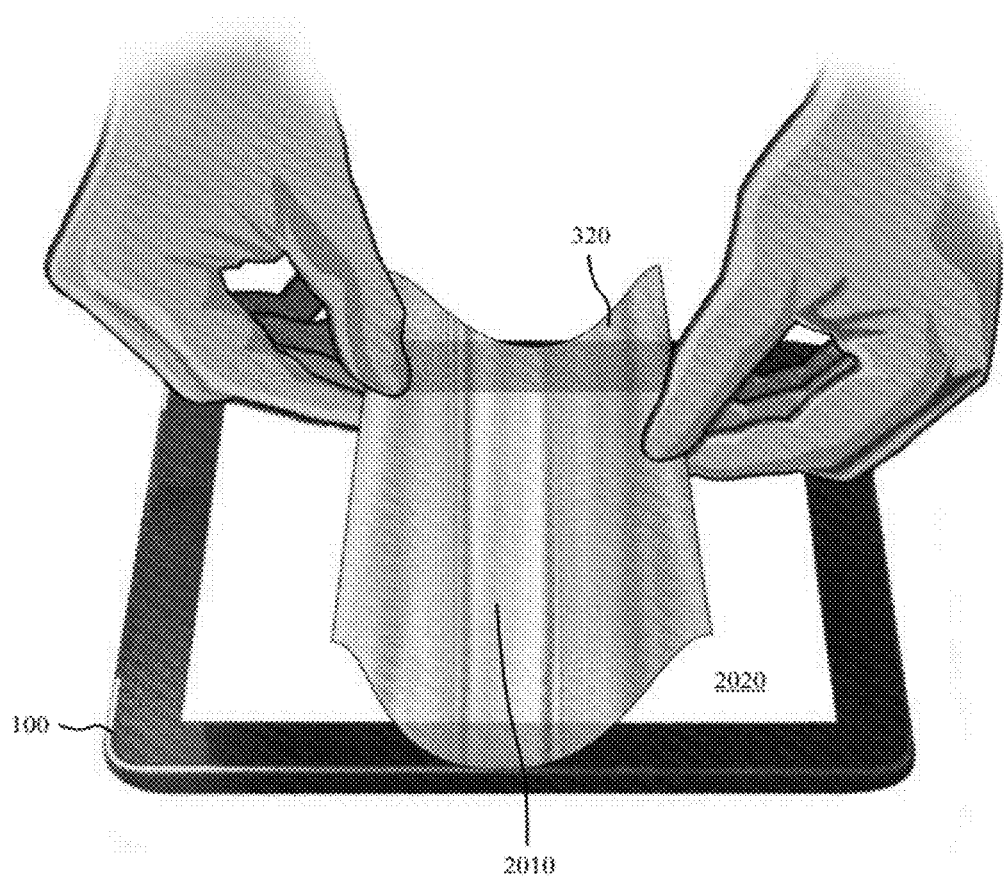
FIG. 20 is a figure showing a parallax barrier apparatus being installed with proper initial alignment, according to an embodiment.
Figure 21:
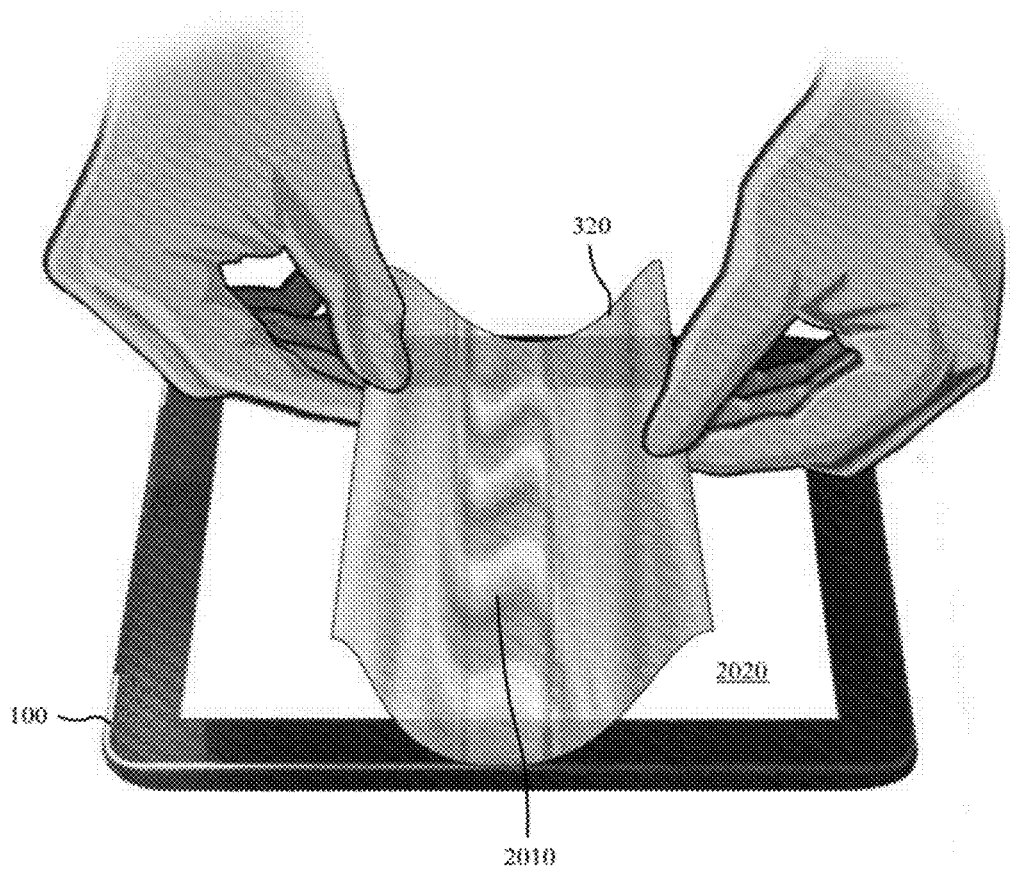
FIG. 21 is a figure showing a parallax barrier apparatus being installed with improper vertical alignment, according to an embodiment.

FIG. 19 also illustrates how a parallax barrier apparatus 320 on a flexible substrate may be applied by bowing the middle of the parallax barrier apparatus 320, ensuring its proper vertical alignment near with the center of the display, and letting the sides down into place. FIG. 20 illustrates a proper initial vertical installation alignment for this type of installation—minimal to no deviations from nearly straight interference lines in a region 2010 in contact with a surface 2020 of the electronic display device 100. FIG. 21 improper initial vertical alignment, signified by diagonal lines and/or banding in the region 2010 in contact with a surface 2020 of the electronic display device 100. As the sides are allowed to settle down in place, proper alignment will exhibit little to no angular appearance to the color bands across the parallel barrier apparatus. Angular extent to the color bands can signify improper alignment.

Other embodiments of the present invention involve other alignment techniques. For example, a corner of the parallax barrier apparatus 320 may be applied to a corresponding corner of a surface of an electronic display device 100, rotated to ensure proper alignment, and let down diagonally. It will be understood that, any number of additional techniques for applying the parallax barrier apparatus can be used.

Application of a parallax barrier apparatus 320 to a surface of an electronic display device 100 may involve temporary lubricants, such as water. Such lubricants may be applied to the parallax barrier apparatus to enable temporary alignment of the parallax barrier apparatus, while being applied to a display. These lubricants may be removed in the course of application via a squeegee.

Another embodiment of the present invention involves the use of static electricity to hold a properly aligned parallax barrier apparatus 320 in place.

Yet another embodiment of the present invention involves purely mechanical alignment by way of a fixture that is locked into place once alignment is effected.

Figure 22:
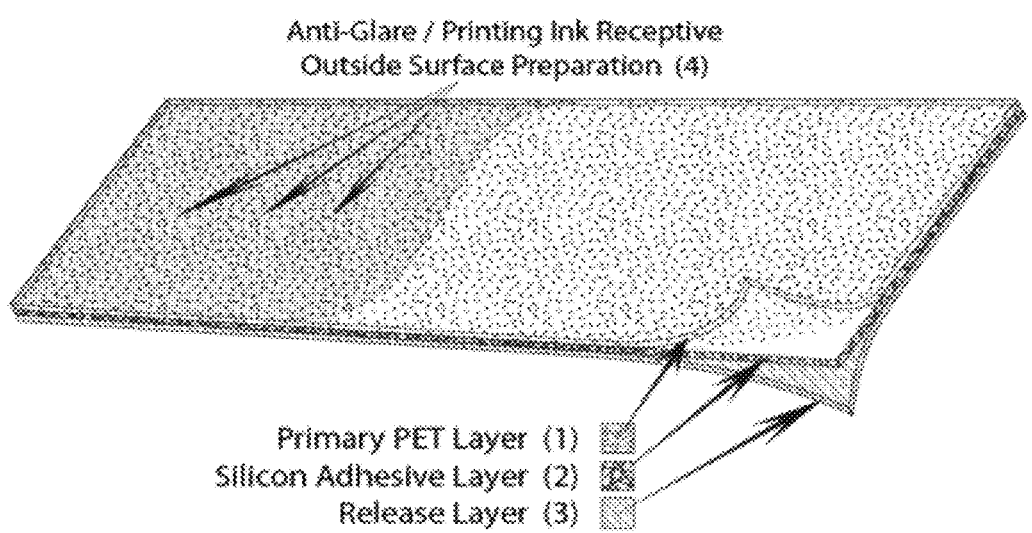
FIG. 22 is an example diagram illustrating the composition of one embodiment of the present invention.

FIG. 22 is a copy of simplified diagram illustrating the composition of one embodiment of the present invention. As shown, a flexible substrate may comprise multiple layers. A first layer can comprise a primary polyethylene terephthalate (PET) layer. According to this embodiment, this layer can be roughly 10 mils with high optical clarity and light transmission. Other embodiments contemplate different thicknesses, such as thicknesses of as little as 5 mils or smaller. Thicknesses of up to 20 mils or more are also contemplated. An outside surface of the primary PET layer may additionally be prepared to reduce glare and/or receive ink printing.

Also, as illustrated in FIG. 22, an adhesive layer can be coupled with the primary PET layer and can comprise any of a number of adhesives. Some embodiments utilize a urea-based pressure sensitive adhesive composition, which is available from 3M Company. These adhesive compositions are described in Patent Cooperation Treaty (PCT) international application number WO 2009085662 A, published on Aug. 27 of 2009, which is incorporated herein in its entirety. Additionally or alternatively, silicone-based adhesives may be used. The layer may be adapted to preferentially adhere to the primary PET layer over glass or other material comprising a display's surface. This layer can provide a "wetting" that adheres the parallax barrier to the surface of the display that allows the parallax barrier to be applied with little or no formation of visible bubbles. Additionally, the wetting can help to minimize light loss and can be adapted to preserve oleophobic coatings on displays. According to some embodiments, this adhesive layer can be washable to enable the reuse and/or reapplication of the parallax barrier apparatus to display surfaces.

Finally, a release layer, such as plastic or coated paper may be used with the parallax barrier apparatus for shipping and storage. The parallax barrier apparatus can comprise a reusable material that can be reapplied to the release layer when the parallax barrier apparatus is not in use. This layer can ensure the parallax barrier apparatus remains free of contaminants when shipped or stored.

Figure 23:
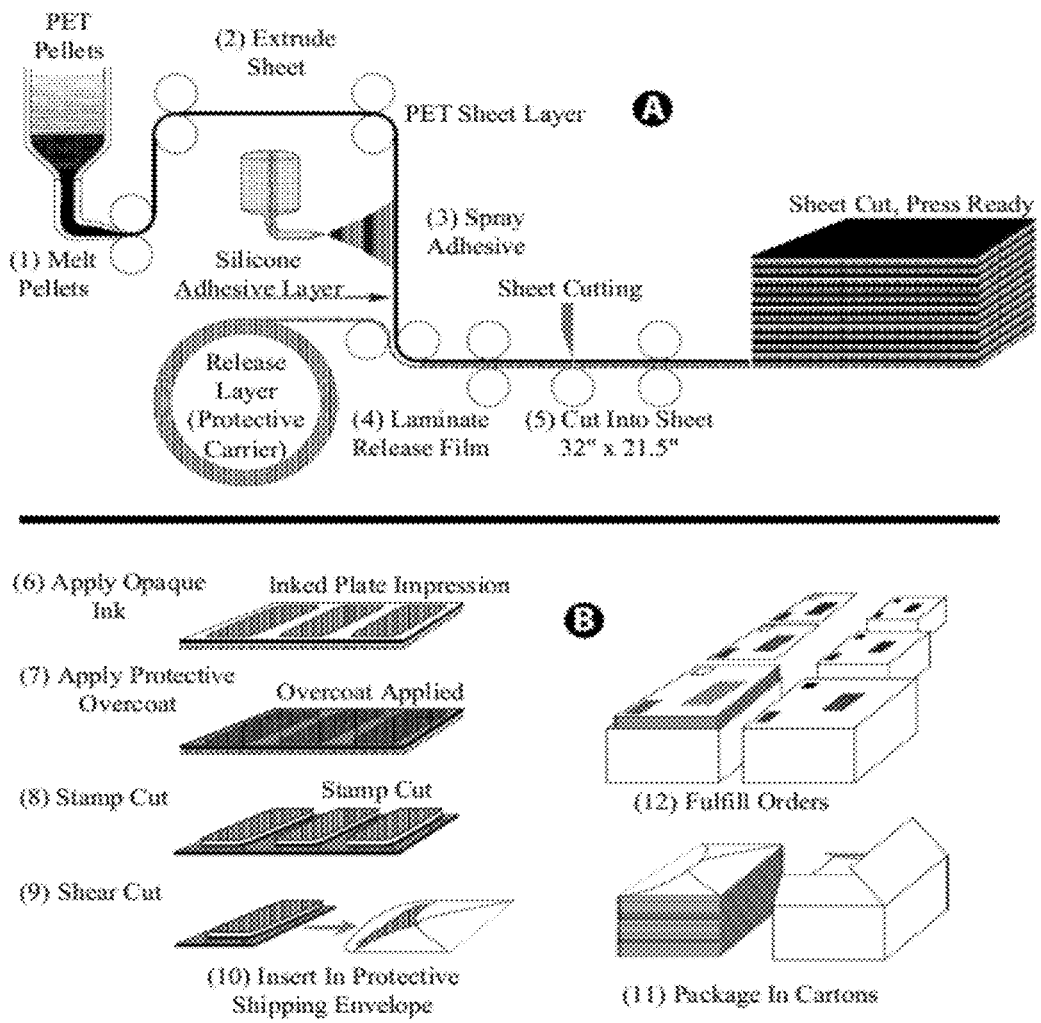
FIG. 23 is a copy of simplified diagram illustrating of how a parallax barrier apparatus may be manufactured, according to one embodiment.

FIG. 23 is a copy of simplified diagram illustrating of how a parallax barrier apparatus 320 may be manufactured, according to one embodiment. For example, as illustrated in portion A of the figure, PET pellets can be melted and extruded to form one or more sheets of PET material. These sheets then can be sprayed with the adhesive layer described above, and applied to a release layer. The resultant sheets can then be cut and prepared for printing.

Printing may be accomplished by way of several commercial printing methods, including lithography and letterpress. Screen printing and very fine pitch dot matrix printing can be used in cases where pixel size is large and printing resolution does not become a factor. In most cases, however, pixel size, in combination with barrier line width tolerance to achieve corrections described above, necessitates exceptionally high resolution printing methods.

The printing and packaging process of the parallax barrier apparatus's manufacture is illustrated in portion B of FIG. 23. Ink, such as water-based and/or acrylic-based ink, can be applied to the prepared sheets, which can comprise a plurality of parallax barrier apparatuses 320. After the ink has been applied, a protective overcoat may also be applied to ensure the integrity of opaque barrier lines formed by the ink. A stamp or die cut may then be performed to separate individual parallax barrier apparatuses, followed by a shear cut to separate the release layer corresponding to each of the individual parallax barrier apparatuses 320, forming a completed parallax barrier apparatus prepared for shipping. These products can then be stored and distributed using normal distribution means.

Figure 24:
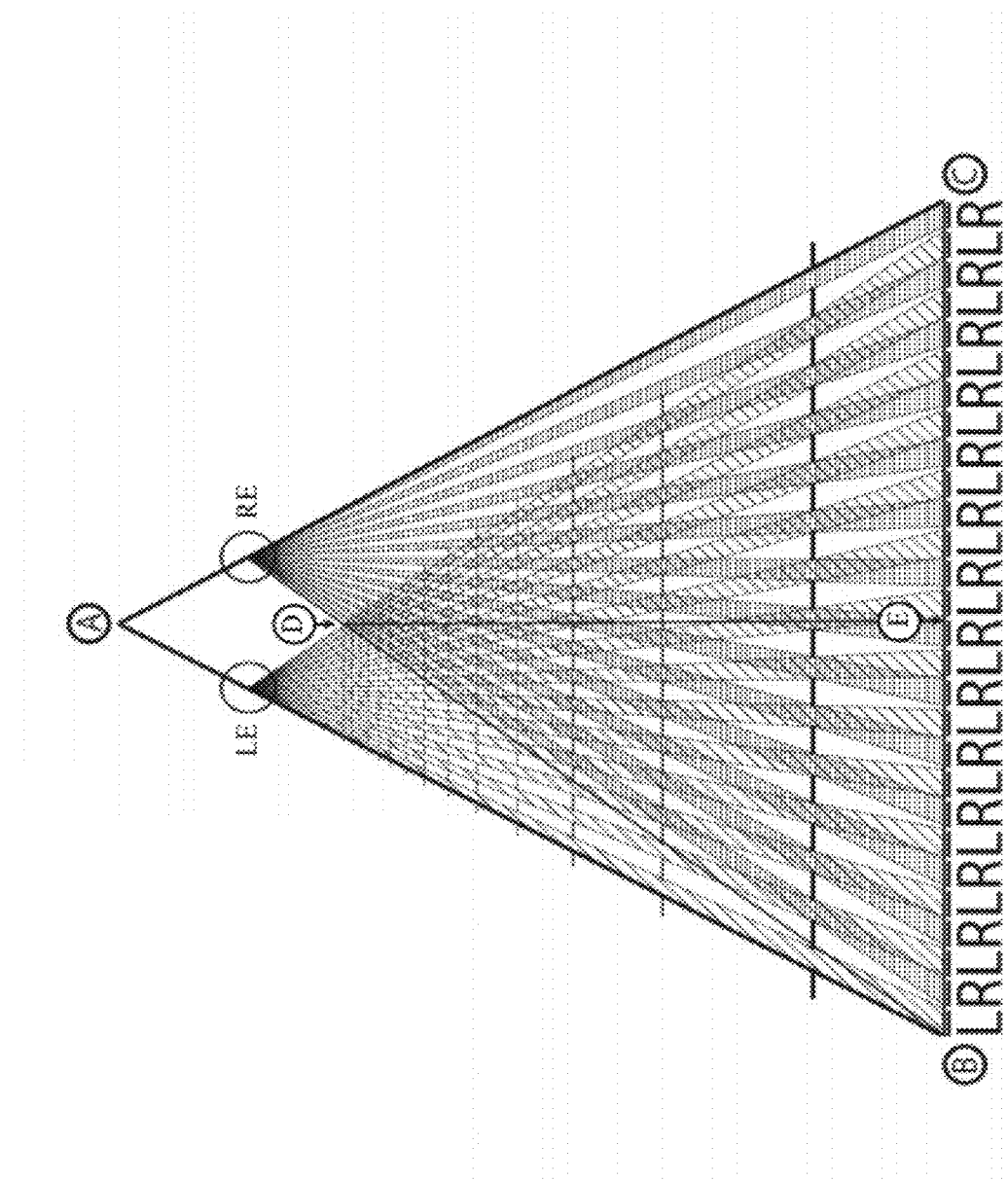
FIG. 24 is an illustration demonstrating the importance of achieving high opacity for barrier lines, according to one embodiment.

FIG. 24 illustrates the importance of achieving high opacity for barrier lines 340. Ideally, barrier lines 340 are 100% opaque. This magnitude of opacity is approached in one embodiment of the present invention by way of multiple lithographic printing press strikes, giving rise to multiple ink layers.

Varying degrees of opacity affect separation. If opacity is less than 50%, separation is lost for nearly all viewers. As opacity is increased, the separation effect (e.g., 3D effect) increases. At opacity levels in excess of 75%, the separation effect becomes pronounced, and adequate for typical consumer use. At opacity levels in excess of 95%, the effect becomes absolute and sufficient for professional reference.

The use of less than absolute opacity has the advantage of reducing "shadows' and the "black banding" effect, but increases "ghosting," which is the perception of separate images when images are displaced for extreme separation.

Figure 25:
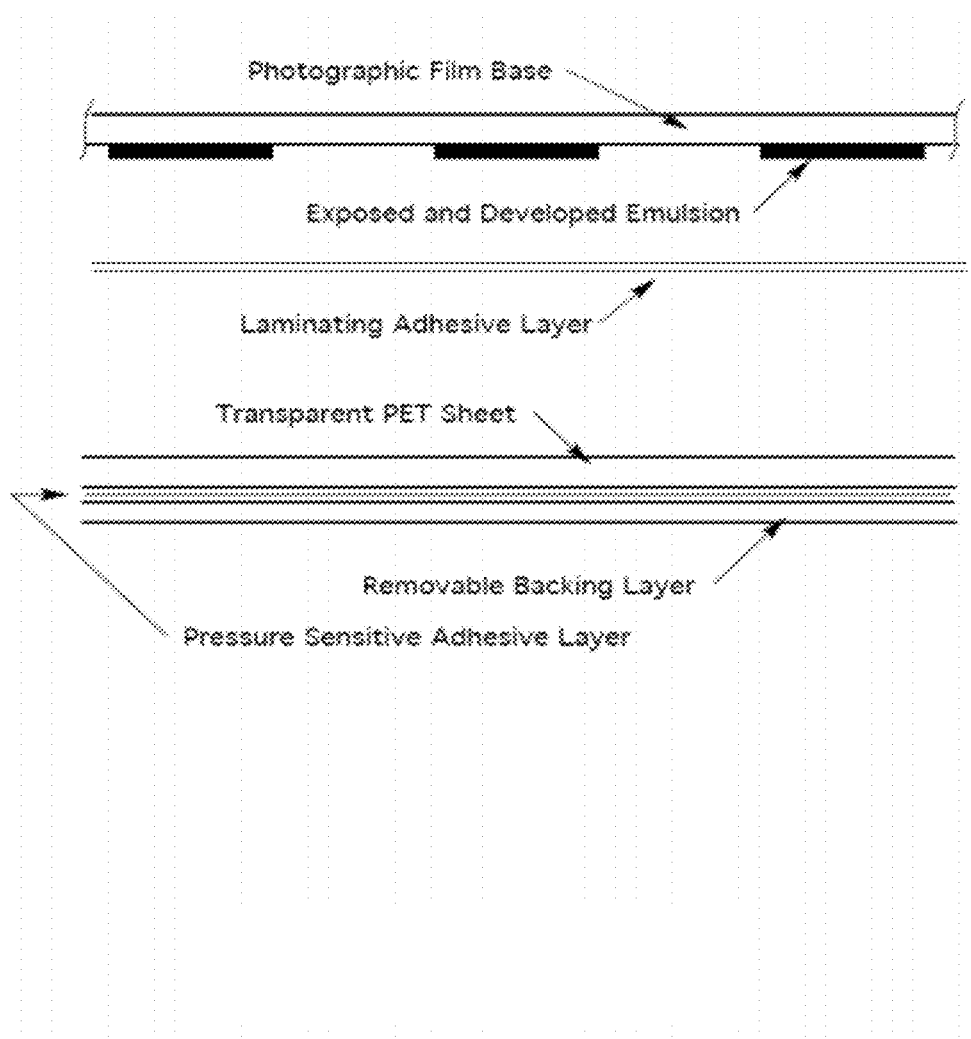
FIGS. 25-27 are illustrations of cross sections of various embodiments of the present invention.

FIG. 25 illustrates a cross section of an embodiment of the present invention that gives rise to exceptionally precise barrier line dimensions and high opacity, especially as necessitated by small display pixel dimensions. A standard monochrome photographic film designed for high contrast, such as the now-discontinued Kodak Professional Copy Film 4125, or equivalent, such as Kodak Professional T-Max 100, is exposed by way of a camera imaging a much larger scaled version of the ultimate barrier line formulation (graphic master) and developed to achieve maximum negative contrast and finest grain to create barrier lines and adjacent transparent channel-apertures by way of the photographic film negative emulsion. The resulting developed emulsion, and hence, barrier lines, can be easily scratched, however. This sensitivity to abuse is eliminated by sandwich laminating the emulsion side to a transparent PET sheet, pre-prepared with pressure sensitive adhesive and a backing layer, as described above. Note that many pressure sensitive adhesives are susceptible to elevated temperatures, necessitating, in certain embodiments, the use of low temperature or even cold lamination. Although not shown, the transparent sheet can have applied to it pressure sensitive adhesive on both sides, each protected in transit by separate backing layers, in order to facilitate sandwich lamination. The resulting parallax barrier apparatus is then applied to a display using any of the installation methods described above.

Figure 26:
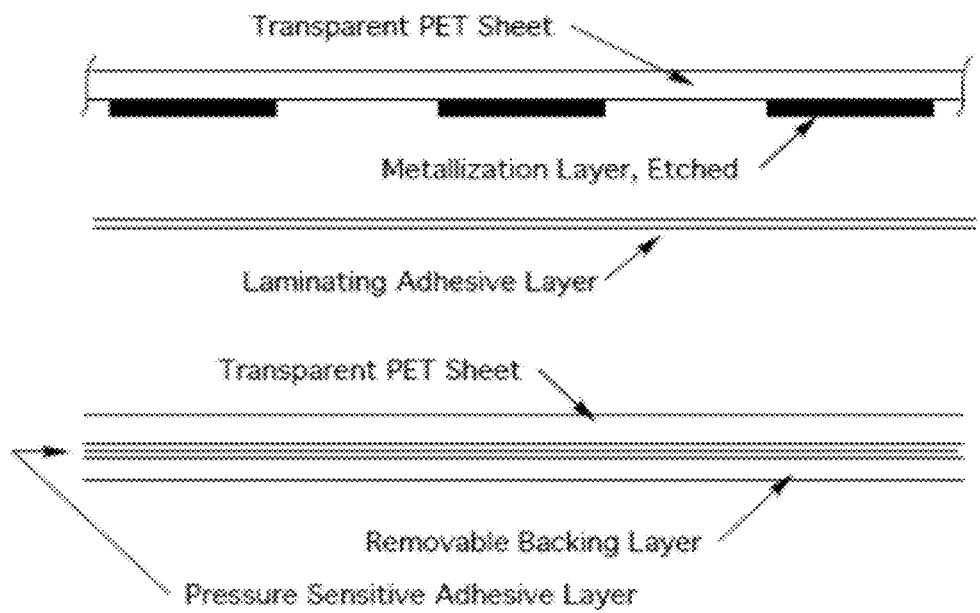

FIG. 26 illustrates another embodiment of the present invention that gives rise to exceptionally precise barrier line dimensions and high opacity, especially as necessitated by small display pixel dimensions. A thin metal layer is deposited (typically by vacuum deposition, but may be laminated) onto a plastic sheet. PET material is used in an embodiment in order to maintain dimensional stability. A standard resist is applied, exposed by way of a camera, and chemically etched to realize metal barrier lines. This embodiment is used in applications where maximum opacity and finest barrier line precision is required, but where the metal barrier lines do not affect other objectives, such as affecting touch screen display utility. As above, the thin metal barrier lines are easily scratched and the same lamination approach described above can eliminate this sensitivity.

Figure 27:
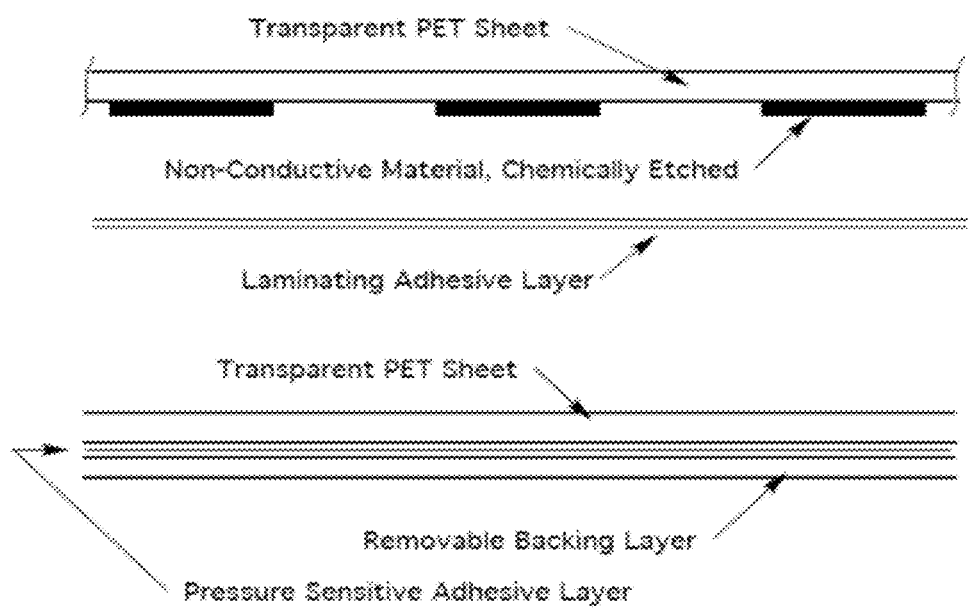

FIG. 27 illustrates another embodiment of the present invention. Opaque material is layered onto a PET sheet substrate, such as by way of screen printing or laminating. A resist is applied to give rise to photosensitivity. A camera is used to expose the resist, similarly to photo microlithographic techniques, including step and repeat. The opaque material is chemically etched to create the transparent channel-apertures and opaque barrier lines. The resulting barrier substrate may be sandwich-laminated to another sheet as described above. Alternatively the resulting barrier substrate may have a pressure sensitive adhesive and backing sheet applied directly, if the barrier lines can withstand exposure to user scratching and other abuse. Alternatively, PET substrates described above with pressure sensitive adhesive and backing already applied may be used by way of applying the opaque material to the non-backing side of the substrate, then applying a resist, then exposing and etching such. This latter approach requires a non-permeable backing material, such as PET.

Figure 28:
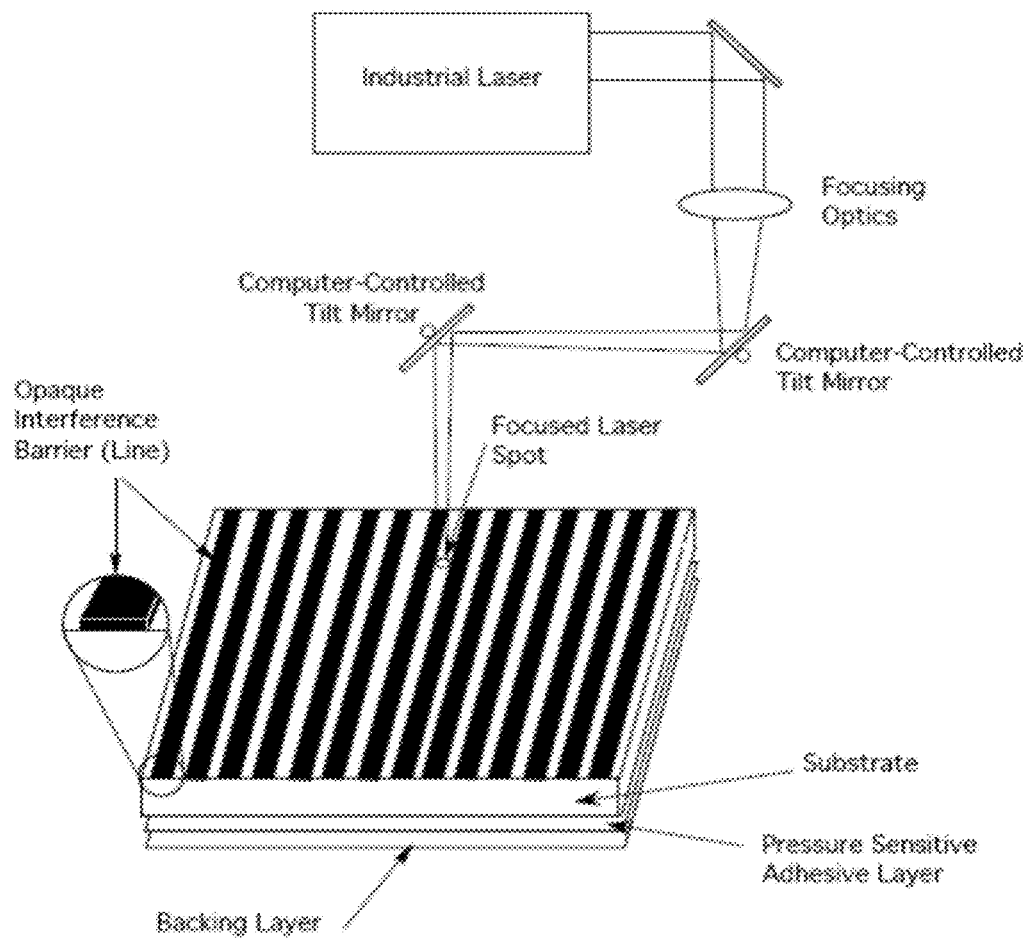
FIG. 28 is an illustration of an embodiment of a manufacturing process in which the parallax barrier is manufactured by laser cutting and/or ablating an opaque coating.

FIG. 28 illustrates another embodiment of the present invention. Similarly to that described above, an opaque (or nearly-opaque) material is layered onto a PET sheet substrate, such as by way of screen printing or laminating. Instead of using a resist and chemical etching, an industrial laser beam is focused and moved over the surface to cut and/or ablate away the opaque material to create transparent channel-apertures, leaving barrier lines where the material is not exposed to laser radiation. The PET sheet substrate is shown in FIG. BB with pressure sensitive adhesive and backing already pre-applied.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A parallax barrier for autostereoscopic viewing of a display with a plurality of columns of pixels, the parallax barrier comprising:
   a substrate comprising a transparent material;
   a plurality of parallel barrier lines disposed on the substrate, wherein:
      each parallel barrier line of the plurality of parallel barrier lines has a width and a height configured to, when the parallax barrier is coupled to the display, obstruct viewing of at least one column of pixels by one eye of a viewer of the display when the viewer is located at one of a plurality of viewing areas;
      the parallax barrier includes corrective adjustments such that, for each parallel barrier line of the plurality of parallel barrier lines, the width the parallel barrier line varies, the width being wider at the center of the parallel barrier than at either end of the parallel barrier; and
      the total number of parallel barrier lines of the parallax barrier is configured to exceed half of the total number of columns of pixels of the display; and
   an adhesive layer enabling the removal and reapplication of the parallax barrier to a surface of the display.

2. The parallax barrier of claim 1, wherein each parallel barrier line of the plurality of parallel barrier lines is configured to, when the parallax barrier is coupled to the display, obstruct viewing of two or more adjacent columns of pixels by the one eye of the viewer of the display.

3. The parallax barrier of claim 1, wherein the substrate comprises a flexible material.

4. The parallax barrier of claim 1, wherein at least one of the parallel barrier lines has a different width than another of the parallel barrier lines.

5. The parallax barrier of claim 4, wherein the width of a first parallel barrier line near a center portion of the parallax barrier is greater than the width of a second parallel barrier line near an edge portion of the parallax barrier.

6. A method of manufacturing a parallax barrier for autostereoscopic viewing of a display with a plurality of columns of pixels, the parallax barrier comprising:
providing a substrate comprising a transparent material;
forming a plurality of parallel barrier lines on the substrate, wherein:
each parallel barrier line of the plurality of parallel barrier lines is formed to have a width and a height configured to, when the parallax barrier is coupled to the display, obstruct viewing of at least one column of pixels by one eye of a viewer of the display when the viewer is located at one of a plurality of viewing areas;
the parallax barrier includes corrective adjustments such that, for each parallel barrier line of the plurality of parallel barrier lines, the width the parallel barrier line varies, the width being wider at the center of the parallel barrier than at either end of the parallel barrier; and
the width of a first parallel barrier line plus a distance between the first parallel barrier line and a second parallel barrier line is less than twice a width of the at least one column of pixels of the display; and
forming an adhesive layer on the substrate, enabling the removal and reapplication of the parallax barrier to a surface of the display.

7. The method of manufacturing the parallax barrier of claim 6, wherein each parallel barrier line of the plurality of parallel barrier lines is configured to, when the parallax barrier is coupled to the display, obstruct viewing of two or more adjacent columns of pixels by the one eye of the viewer of the display.

8. The method of manufacturing the parallax barrier of claim 6, wherein the substrate comprises a flexible material.

9. The method of manufacturing the parallax barrier of claim 6, wherein at least one of the parallel barrier lines is formed to have a different width than another of the parallel barrier lines.

10. The method of manufacturing the parallax barrier of claim 9, wherein the width of a third parallel barrier line near a center portion of the parallax barrier is greater than the width of a fourth parallel barrier line near an edge portion of the parallax barrier.

11. An apparatus which, when coupled to a display with a plurality of columns of pixels, enables autostereoscopic viewing of the display, the apparatus comprising:
an adhesive layer enabling the removal and reapplication of the apparatus to a surface of the display; and
a transparent substrate configured to be coupled, via the adhesive layer, to the display, the transparent substrate having a plurality of parallel barrier lines, wherein:
each parallel barrier line of the plurality of parallel barrier lines has a width and a height configured to, when the apparatus is coupled to the display, obstruct viewing of at least one column of pixels by one eye of a viewer of the display when the viewer is located at one of a plurality of viewing areas;
the parallax barrier includes corrective adjustments such that, for each parallel barrier line of the plurality of parallel barrier lines, the width the parallel barrier line varies, the width being wider at the center of the parallel barrier than at either end of the parallel barrier;
each parallel barrier line of the plurality of parallel barrier lines is separated from another parallel barrier line by an adjacent transparent channel-aperture; and
a barrier period, defined by the width of one parallel barrier line plus the width of one transparent channel aperture, is less than twice a width of the at least one column of pixels of the display.

12. The apparatus of claim 11, wherein the width of at least one parallel barrier line is partly determined based on a thickness of the at least one parallel barrier line.

13. The apparatus of claim 11, wherein the transparent substrate comprises a flexible material.

14. The apparatus of claim 11, wherein the at least one column of pixels comprises two or more adjacent columns of pixels.

15. The apparatus of claim 11, wherein at least one of the parallel barrier lines has a different width than another of the parallel barrier lines.

* * * * *